US010091702B2

(12) United States Patent
Park et al.

(10) Patent No.: US 10,091,702 B2
(45) Date of Patent: Oct. 2, 2018

(54) FORWARDING NODE SELECTION AND ROUTING FOR DELAY-TOLERANT MESSAGES

(71) Applicant: QUALCOMM Incorporated, San Diego, CA (US)

(72) Inventors: Vincent Douglas Park, Budd Lake, NJ (US); Karl Georg Hampel, New York, NY (US)

(73) Assignee: QUALCOMM Incorporated, San Diego, CA (US)

( * ) Notice: Subject to any disclaimer, the term of this patent is extended or adjusted under 35 U.S.C. 154(b) by 143 days.

(21) Appl. No.: 15/212,590

(22) Filed: Jul. 18, 2016

(65) Prior Publication Data

US 2018/0020390 A1    Jan. 18, 2018

(51) Int. Cl.
*H04W 40/18* (2009.01)
*H04L 12/875* (2013.01)
*H04W 40/22* (2009.01)
*H04W 88/04* (2009.01)

(52) U.S. Cl.
CPC ............ *H04W 40/18* (2013.01); *H04L 47/56* (2013.01); *H04W 40/22* (2013.01); *H04W 88/04* (2013.01)

(58) Field of Classification Search
None
See application file for complete search history.

(56) References Cited

U.S. PATENT DOCUMENTS

| 6,735,178 | B1 | 5/2004 | Srivastava et al. | |
|---|---|---|---|---|
| 8,620,336 | B2 | 12/2013 | Golaup et al. | |
| 9,198,216 | B2* | 11/2015 | Fan | H04W 76/027 |
| 2009/0141667 | A1 | 6/2009 | Jin et al. | |
| 2015/0351084 | A1* | 12/2015 | Werb | H04W 12/08 370/329 |
| 2016/0157268 | A1* | 6/2016 | Wakabayashi | H04W 24/10 370/329 |

(Continued)

FOREIGN PATENT DOCUMENTS

| WO | WO 2013123445 A1 | 8/2013 |
|---|---|---|
| WO | WO-2016005267 A1 | 1/2016 |

(Continued)

OTHER PUBLICATIONS

Chakchouk, "A Survey on Opportunistic Routing in Wireless Communication Networks," IEEE Communications Surveys & Tutorials, Nov. 1, 2015, pp. 2214-2241, vol. 17, No. 4, XP011590603, DOI: 1 0.11 09/COMST.2015.2411335, Institute of Electrical and Electronics Engineers [retrieved on Nov. 18, 2015].

(Continued)

*Primary Examiner* — Brian Roberts
(74) *Attorney, Agent, or Firm* — Holland & Hart LLP

(57) ABSTRACT

A wireless relay device may receive a request indicating that a wireless device has one or more delay-tolerant messages to be forwarded to a network. The wireless relay device may send a response message to the wireless device indicative of an estimated time to network contact. The wireless relay device then receives and caches the delay-tolerant messages to be forwarded. The wireless relay device may forward at least one of the one or more delay-tolerant messages.

108 Claims, 13 Drawing Sheets

(56) References Cited

U.S. PATENT DOCUMENTS

2017/0295104 A1* 10/2017 Hampel .................. H04L 47/24
2017/0295598 A1* 10/2017 Hampel ................ H04W 76/02

FOREIGN PATENT DOCUMENTS

WO    WO-2016064525 A1    4/2016
WO    WO-2016077003 A1    5/2016

OTHER PUBLICATIONS

ISA/EP, International Search Report and Written Opinion of the International Searching Authority, Int'l Application No. PCT/US2017/035926, dated Oct. 16, 2017, European Patent Office, Rijswijk, NL, 21 pgs.
Al-Fagih A.E., et al., "A Priced Public Sensing Framework for Heterogeneous IoT Architectures," IEEE Transactions on Emerging Topics in Computing, Jun. 2013, vol. 1 (1), pp. 133-147.
Lee J., et al., "Short Paper: A Human Mobility Pattern-based Routing Protocol for Delay Tolerant Networks," IEEE World Forum on Internet of Things (WF-IoT), 2014, pp. 175-176.

* cited by examiner

FORWARDING NODE SELECTION AND ROUTING FOR DELAY-TOLERANT MESSAGES

BACKGROUND

The following relates generally to wireless communication, and more specifically to selection of nodes and routing for delay-tolerant messages.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be referred to herein as user equipment (UE). A base station may communicate with UEs on downlink channels (e.g., for transmissions from a base station to a UE) and uplink channels (e.g., for transmissions from a UE to a base station).

Other wireless devices may also be deployed and may have limited available power and also a limited means to directly connect to a wireless network (e.g., due to the costs associated with equipping such devices with the hardware and subscription costs associated with cellular communications). These other wireless devices may include wearable devices, sensor nodes, internet-of-things (IoT) devices, etc. Despite their limited available power or communication means, these other devices may nevertheless collect data that would ideally be transmitted to a network. The collected data may generally be limited in quantity and may often be delay-tolerant. In one scenario, these low-power and other devices may be equipped with wireless local area network (WLAN) (e.g., Wi-Fi) hardware. However, the devices may suffer from WLAN connectivity concerns due to limited WLAN coverage, changing WLAN configurations and settings, and so on. Therefore, other options for conveying the delay-tolerant data to a network are desirable.

SUMMARY

The present disclosure relates to improved techniques that support the selection of nodes and routing for forwarding delay-tolerant messages. Generally, the described techniques provide for a wireless relay device, such as a user equipment (UE), to receive a delay tolerant message and forward the message to an appropriate wireless network. The UE may receive a request indicating that a wireless device (e.g., an internet-of-things (IoT) device) has one or more delay-tolerant messages to be forwarded to a network. The UE may send a response message to the wireless device that may indicate an estimated time to network contact. Based on the indication received from the UE, the wireless device may determine whether the UE is a good candidate for forwarding a delay-tolerant message to the network. If the UE is a good candidate, the wireless device may transmit to the UE the delay-tolerant message for forwarding to the network. The UE may cache the received delay-tolerant message for a period of time. When the UE attaches to the network, the UE may then forward the delay-tolerant message to the network.

The described techniques also include method in which a wireless device sends a request indicating that the wireless device has a delay-tolerant message to be forwarded to a network. The request may include a delay tolerance or a deadline for when the message is to be forwarded to the network. One or more UEs may receive the request and may respond if they are able to forward a message in accordance with the received delay tolerance or deadline. The wireless device may then receive response messages from one or more UEs. In some cases, the response messages may also indicate an estimated time to network contact. These messages may be evaluated by the wireless device to determine a UE to which the device may forward the delay-tolerant message. The wireless device may then transmit the delay-tolerant message to the identified UE, which may then forward the message to the network. A UE may forward a message to the network directly or via other UEs.

A method of wireless communication is described. The method may include receiving, at a first wireless relay device, a request indicating that a wireless device has one or more delay-tolerant messages to be forwarded to a network, sending a response message to the wireless device indicative of an estimated time to network contact, receiving and caching the one or more delay-tolerant messages to be forwarded, and forwarding at least one of the one or more delay-tolerant messages.

An apparatus for wireless communication is described. The apparatus may include means for receiving, at a first wireless relay device, a request indicating that a wireless device has one or more delay-tolerant messages to be forwarded to a network, means for sending a response message to the wireless device indicative of an estimated time to network contact, means for receiving and caching the one or more delay-tolerant messages to be forwarded, and means for forwarding at least one of the one or more delay-tolerant messages.

Another apparatus for wireless communication is described. The apparatus may include a processor, memory in electronic communication with the processor, and instructions stored in the memory. The instructions may be operable to cause the processor to receive, at a first wireless relay device, a request indicating that a wireless device has one or more delay-tolerant messages to be forwarded to a network, send a response message to the wireless device indicative of an estimated time to network contact, receive and caching the one or more delay-tolerant messages to be forwarded, and forward at least one of the one or more delay-tolerant messages.

A non-transitory computer readable medium for wireless communication is described. The non-transitory computer-readable medium may include instructions operable to cause a processor to receive, at a first wireless relay device, a request indicating that a wireless device has one or more delay-tolerant messages to be forwarded to a network, send a response message to the wireless device indicative of an estimated time to network contact, receive and caching the one or more delay-tolerant messages to be forwarded, and forward at least one of the one or more delay-tolerant messages.

Some examples of the method, apparatus, and non-transitory computer-readable medium described above may further include processes, features, means, or instructions for receiving a message from a second wireless relay device indicating at least an estimated time to network contact for the second wireless relay device. Some examples of the method, apparatus, and non-transitory computer-readable medium described above may further include processes, features, means, or instructions for forwarding the at least one of the one or more delay-tolerant messages to the second wireless relay device.

Some examples of the method, apparatus, and non-transitory computer-readable medium described above may further include processes, features, means, or instructions for receiving a cost metric from the second wireless relay device, wherein forwarding the at least one of the one or more delay tolerant messages may be based at least in part on the received cost metric.

In some examples of the method, apparatus, and non-transitory computer-readable medium described above, sending the response message to the wireless device comprises: including the estimated time to network contact in the response message.

In some examples of the method, apparatus, and non-transitory computer-readable medium described above, the request comprises a delay tolerance or a deadline for when the one or more delay-tolerant messages may be to be sent to the network.

In some examples of the method, apparatus, and non-transitory computer-readable medium described above, sending the response message to the wireless device comprises: comparing the estimated time to network contact with the delay tolerance or deadline. Some examples of the method, apparatus, and non-transitory computer-readable medium described above may further include processes, features, means, or instructions for sending the response message to the wireless device based on the comparing.

Some examples of the method, apparatus, and non-transitory computer-readable medium described above may further include processes, features, means, or instructions for deleting one or more of the delay-tolerant messages based at least in part on the one or more of the delay-tolerant messages not being forwarded within the delay tolerance or within the deadline.

Some examples of the method, apparatus, and non-transitory computer-readable medium described above may further include processes, features, means, or instructions for determining, by the first wireless relay device, the estimated time to network contact indicating a next time the first wireless relay device may be expected to make network contact for at least one radio access technology (RAT) using a history of contact with the network via the at least one RAT.

Some examples of the method, apparatus, and non-transitory computer-readable medium described above may further include processes, features, means, or instructions for maintaining the determined estimated time to network contact for each respective RAT that the first wireless relay device may be capable of using.

Some examples of the method, apparatus, and non-transitory computer-readable medium described above may further include processes, features, means, or instructions for calculating a cost metric for at least one RAT, wherein the cost metric may be based on at least one of: monetary costs, wireless relay device resource usage, channel quality, or an existing connection the first wireless relay device may have with the network. Some examples of the method, apparatus, and non-transitory computer-readable medium described above may further include processes, features, means, or instructions for transmitting the calculated cost metric to the wireless device.

In some examples of the method, apparatus, and non-transitory computer-readable medium described above, at least one of the one or more delay-tolerant messages remains cached based at least in part on the calculated cost metric.

In some examples of the method, apparatus, and non-transitory computer-readable medium described above, the estimated time to network contact may be based on at least one of: supported access networks, mobility patterns, application traffic dynamics, or combinations thereof.

Some examples of the method, apparatus, and non-transitory computer-readable medium described above may further include processes, features, means, or instructions for broadcasting a message indicating an estimated time to network contact.

In some examples of the method, apparatus, and non-transitory computer-readable medium described above, the at least one of the one or more delay-tolerant messages may be forwarded to the network.

A method of wireless communication is described. The method may include sending, from a wireless device, a request indicating that the wireless device has one or more delay-tolerant messages to be forwarded to a network, receiving one or more response messages from a corresponding one or more wireless relay devices, the one or more response messages each indicative of an estimated time to network contact for corresponding wireless relay devices, evaluating the one or more response messages to determine at least one of the one or more wireless relay devices to which the one or more delay-tolerant messages may be sent in order to be forwarded to the network, and transmitting the one or more delay-tolerant messages to the at least one of the one or more wireless relay devices.

An apparatus for wireless communication is described. The apparatus may include means for sending, from a wireless device, a request indicating that the wireless device has one or more delay-tolerant messages to be forwarded to a network, means for receiving one or more response messages from a corresponding one or more wireless relay devices, the one or more response messages each indicative of an estimated time to network contact for corresponding wireless relay devices, means for evaluating the one or more response messages to determine at least one of the one or more wireless relay devices to which the one or more delay-tolerant messages may be sent in order to be forwarded to the network, and means for transmitting the one or more delay-tolerant messages to the at least one of the one or more wireless relay devices.

Another apparatus for wireless communication is described. The apparatus may include a processor, memory in electronic communication with the processor, and instructions stored in the memory. The instructions may be operable to cause the processor to send, from a wireless device, a request indicating that the wireless device has one or more delay-tolerant messages to be forwarded to a network, receive one or more response messages from a corresponding one or more wireless relay devices, the one or more response messages each indicative of an estimated time to network contact for corresponding wireless relay devices, evaluate the one or more response messages to determine at least one of the one or more wireless relay devices to which the one or more delay-tolerant messages may be sent in order to be forwarded to the network, and transmit the one or more delay-tolerant messages to the at least one of the one or more wireless relay devices.

A non-transitory computer readable medium for wireless communication is described. The non-transitory computer-readable medium may include instructions operable to cause a processor to send, from a wireless device, a request indicating that the wireless device has one or more delay-tolerant messages to be forwarded to a network, receive one or more response messages from a corresponding one or more wireless relay devices, the one or more response messages each indicative of an estimated time to network contact for corresponding wireless relay devices, evaluate the one or more response messages to determine at least one of the one or more wireless relay devices to which the one or more delay-tolerant messages may be sent in order to be forwarded to the network, and transmit the one or more delay-tolerant messages to the at least one of the one or more wireless relay devices.

In some examples of the method, apparatus, and non-transitory computer-readable medium described above, sending the request comprises: including in the request a delay tolerance or a deadline for when the one or more delay-tolerant messages may be to be forwarded to the network.

In some examples of the method, apparatus, and non-transitory computer-readable medium described above, the one or more response messages further comprise a cost metric, wherein the cost metric may be based on at least one of: monetary costs, wireless relay device resource usage, channel quality, or an existing connection a wireless relay device may have with the network.

In some examples of the method, apparatus, and non-transitory computer-readable medium described above, the estimated time to network contact may be based on at least one of: supported access networks, mobility patterns, application traffic dynamics, or combinations thereof.

In some examples of the method, apparatus, and non-transitory computer-readable medium described above, the one or more response messages comprise one or more broadcast messages received from the one or more wireless relay devices.

In some examples of the method, apparatus, and non-transitory computer-readable medium described above, evaluating the one or more response messages further comprises: determining a probability that the one or more delay-tolerant messages will be forwarded to the network within a delay tolerance or before a deadline.

In some examples of the method, apparatus, and non-transitory computer-readable medium described above, sending the request comprises using a transmission protocol that may be one of: Bluetooth low energy (BLE), WiFi Aware, Long Term Evolution (LTE) Direct, or LTE Proximity Services.

A method of wireless communication is described. The method may include sending, from a wireless device, a request indicating that the wireless device has one or more delay-tolerant messages to be forwarded to a network, and the request including a delay tolerance or a deadline for when the one or more delay-tolerant messages are to be forwarded to the network, receiving one or more response messages from a corresponding one or more wireless relay devices, and transmitting the one or more delay-tolerant messages to the at least one of the one or more wireless relay devices.

An apparatus for wireless communication is described. The apparatus may include means for sending, from a wireless device, a request indicating that the wireless device has one or more delay-tolerant messages to be forwarded to a network, and the request including a delay tolerance or a deadline for when the one or more delay-tolerant messages are to be forwarded to the network, means for receiving one or more response messages from a corresponding one or more wireless relay devices, and means for transmitting the one or more delay-tolerant messages to the at least one of the one or more wireless relay devices.

Another apparatus for wireless communication is described. The apparatus may include a processor, memory in electronic communication with the processor, and instructions stored in the memory. The instructions may be operable to cause the processor to send, from a wireless device, a request indicating that the wireless device has one or more delay-tolerant messages to be forwarded to a network, and the request including a delay tolerance or a deadline for when the one or more delay-tolerant messages are to be forwarded to the network, receive one or more response messages from a corresponding one or more wireless relay devices, and transmit the one or more delay-tolerant messages to the at least one of the one or more wireless relay devices.

A non-transitory computer readable medium for wireless communication is described. The non-transitory computer-readable medium may include instructions operable to cause a processor to send, from a wireless device, a request indicating that the wireless device has one or more delay-tolerant messages to be forwarded to a network, and the request including a delay tolerance or a deadline for when the one or more delay-tolerant messages are to be forwarded to the network, receive one or more response messages from a corresponding one or more wireless relay devices, and transmit the one or more delay-tolerant messages to the at least one of the one or more wireless relay devices.

Some examples of the method, apparatus, and non-transitory computer-readable medium described above may further include processes, features, means, or instructions for evaluating the one or more response messages to determine at least one of the one or more wireless relay devices to which the one or more delay tolerant messages may be sent in order to be forwarded to the network, wherein the one or more response messages include one or more evaluation parameters.

In some examples of the method, apparatus, and non-transitory computer-readable medium described above, the one or more evaluation parameters include a cost metric, wherein the cost metric may be based on at least one of: monetary costs, wireless relay device resource usage, channel quality, or an existing connection a wireless relay device may have with the network.

In some examples of the method, apparatus, and non-transitory computer-readable medium described above, the one or more evaluation parameters include an estimated time to network contact for the corresponding wireless relay device, wherein the estimated time to network contact may be based on at least one of: supported access networks, mobility patterns, application traffic dynamics, or combinations thereof.

In some examples of the method, apparatus, and non-transitory computer-readable medium described above, evaluating the one or more response messages further comprises: determining a probability that the one or more delay-tolerant messages will be forwarded to the network within the delay tolerance or before the deadline.

In some examples of the method, apparatus, and non-transitory computer-readable medium described above, sending the request comprises using a transmission protocol that may be one of: Bluetooth Low Energy (BLE), WiFi Aware, Long Term Evolution (LTE) Direct, or LTE Proximity Services.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

DETAILED DESCRIPTION

Figure 1:
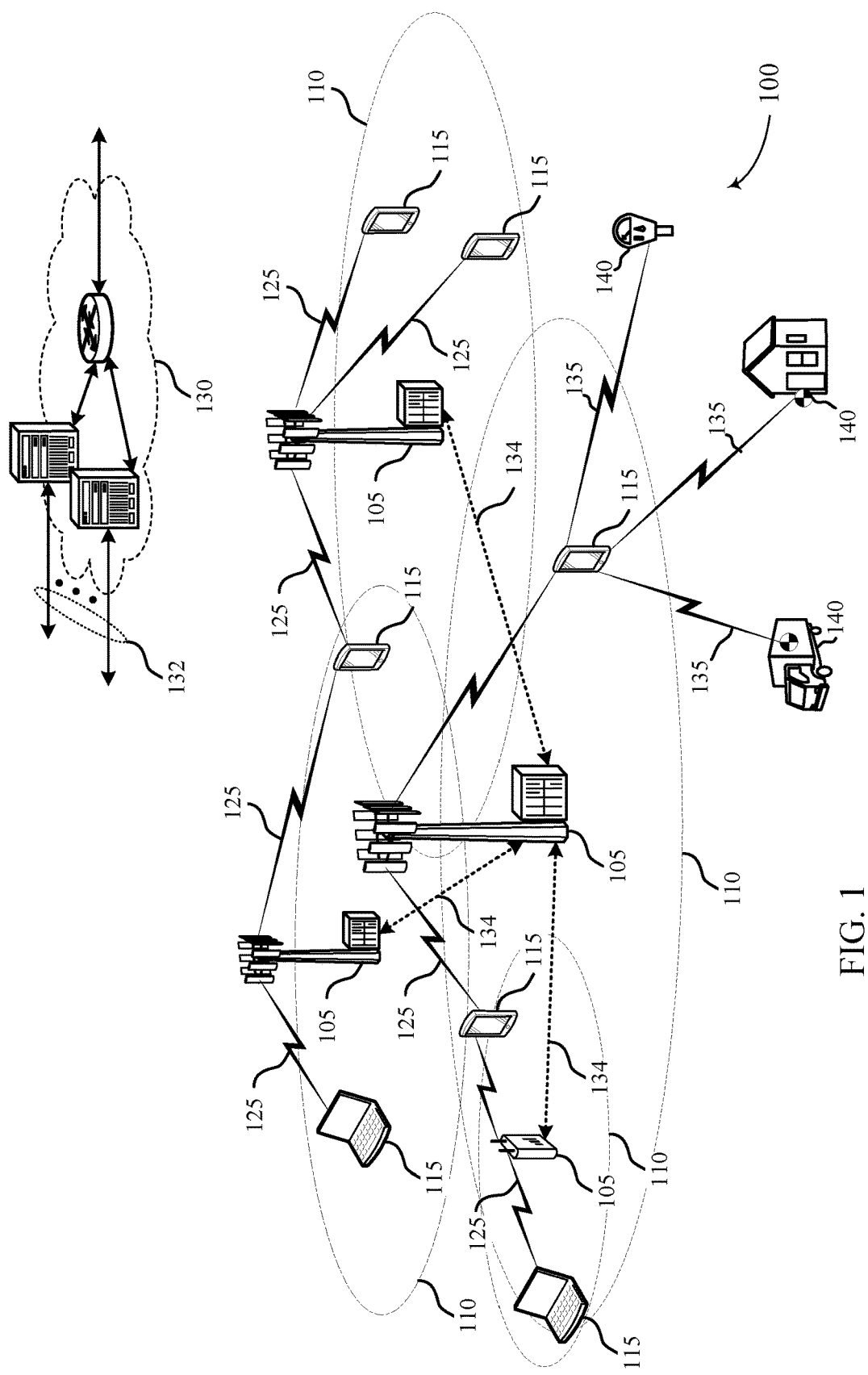
FIG. 1 shows a block diagram of a wireless communication system, in accordance with various aspects of the present disclosure.

Certain wireless devices may not be equipped for communications via every available air interface. For example, the cost and/or complexity associated with a cellular air interface, such as a Long Term Evolution (LTE)/LTE-Advanced (LTE-A) network may be inappropriate for sensor devices, wearable devices, internet-of-things (IoT) devices, etc. While a Wireless Local Area Network (WLAN) may be somewhat less costly, at least from a subscription perspective, these Wi-Fi networks typically require close proximity to the source device and/or can include complicated association overhead. Some of these source devices may utilize transmission protocols such as Bluetooth Low Energy (BLE), WiFi Aware, LTE Direct, or LTE Proximity Services.

The source devices may support environmental measurements, structural health monitoring, smart-city applications, health or location tracking applications, usage monitoring of various electrical devices, etc. However, due to cost, complexity, and other issues, these source devices typically rely on other smart devices, such as a nearby user equipment (UE), to provide various services, e.g., relay services, concurrent connection services, local connection services, etc. By using nearby UEs, a source device may be able to transmit collected data to a network via one or more of the UEs. The data that is transmitted is typically in the form of small data messages (in some examples) with a low duty cycle (once per hour, day, or month). Moreover, the transmitted data messages may be associated with a high latency such that immediate delivery of the message is not a priority.

To improve access cost and resource utilization for message forwarding, the delay-tolerant nature of the messages may be exploited. A plurality of UEs may be capable of forwarding these messages to a network; however, some UEs may be more suitable than others. For example, the availability of access networks, their respective access technology, and the associated delivery cost may be relevant. A wireless device, such as an IoT device, may select the most appropriate UE to forward its messages to by balancing factors such as the urgency of the message, the probability that the UE will deliver the message within a certain period of time, the cost of transmitting the message, etc.

Aspects of the disclosure are initially described in the context of a wireless communication system. Aspects of the present disclosure relate to the forwarding of delay-tolerant data or messages from IoT devices by a UE to a network or cloud server. An IoT device that has a delay-tolerant message available for forwarding may compare a metric such as an Estimated Time to Network Contact (ETNC) of available UEs with a latency tolerance for the message to be delivered to a network. The available UEs may maintain a separate ETNC value for each radio access technology (RAT) utilized by the UE. In addition to the ETNC of the available UEs, other factors in selecting potential UEs for forwarding may include various delivery cost metrics. Once the UEs have been evaluated, the IoT device may transmit its delay-tolerant messages to the selected UE, and in turn, the UE may forward the messages to the network.

In other aspects, an IoT device that has a delay-tolerant message available for forwarding may broadcast a request that includes either a delay tolerance or a deadline for delivery of the message to a network. UEs that are able to forward the message in accordance with the broadcast delay tolerance or deadline may respond to the IoT device. The IoT device may select from among the responding UEs a UE to which to forward the delay-tolerant message. The IoT device may transmit its delay-tolerant messages to the selected UE, and in turn, the UE may forward the messages to the network.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the disclosure. The wireless communications system 100 includes base stations 105, UEs 115, a core network 130, and wireless devices 140. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies.

In some examples, the wireless communications system 100 is an LTE/LTE-A network. In some examples, the wireless communications system 100 may be a fifth generation (5G) ecosystem featuring a high frequency communication system such as a millimeter wave (mmW) system for mobile communications. In LTE/LTE-A networks, the term evolved Node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like. A UE 115 may communicate with a base station 105 via transmission 125. Transmission 125 may utilize licensed spectrum protocols (e.g., 3G, 4G (LTE), 5G, etc.), or unlicensed spectrum protocols (e.g., WiFi, Bluetooth, etc.).

Wireless communications system 100 may be a heterogeneous wireless network that supports communications using a variety of air interfaces. In some aspects, the supported air interfaces may be a set of air interfaces that are available for wireless communications. Each air interface may be associated with a different radio access technology (RAT), such as a cellular RAT, a Wi-Fi RAT, a Bluetooth (BT) RAT, a ZigBee RAT, etc. Additionally or alternatively, each air interface may be associated with a different wireless network operator, a different public land mobile network (PLMN), etc. Additionally or alternatively, each air interface may be associated with a licensed radio frequency spectrum band and/or an unlicensed radio frequency spectrum band. The UEs 115 may support communications on a variety of different air interfaces, e.g., cellular, Wi-Fi, BT, etc.

In certain aspects, wireless communications system 100 may support forwarding delay-tolerant messages. For example, a UE 115 may receive a request via transmission 135 from a wireless device (such as an IoT device) to forward delay-tolerant messages to a network. Examples of these wireless devices may include wireless devices 140. Wireless device 140 may include a sensor on a vehicle, in a home, or in a parking meter. The request may include an indication of a delay tolerance or a deadline for when one or more messages from the wireless device are to be forwarded to a network. The UE 115 may send a response message to the wireless device via relay link 135. Relay link 135 may utilize unlicensed spectrum protocols (e.g., WiFi, Bluetooth, Bluetooth Low Energy (BLE), Zigbee, 802.15.4, etc.), or it may utilize licensed spectrum protocols (e.g., LTE-D, LTE-NB-IoT, 5G, etc.). In some instances, the UE 115 may include an indication of an ETNC in the response message. The UE 115 may also include in the response message a cost metric for forwarding the delay-tolerant messages to the network. Using this information, the wireless device may evaluate a UE that is most suitable for forwarding the wireless device's delay-tolerant messages to a network. The wireless device may then transmit the delay-tolerant messages to the chosen UE via transmission 135, which may then forward the message when its next network contact occurs.

Figure 2A:
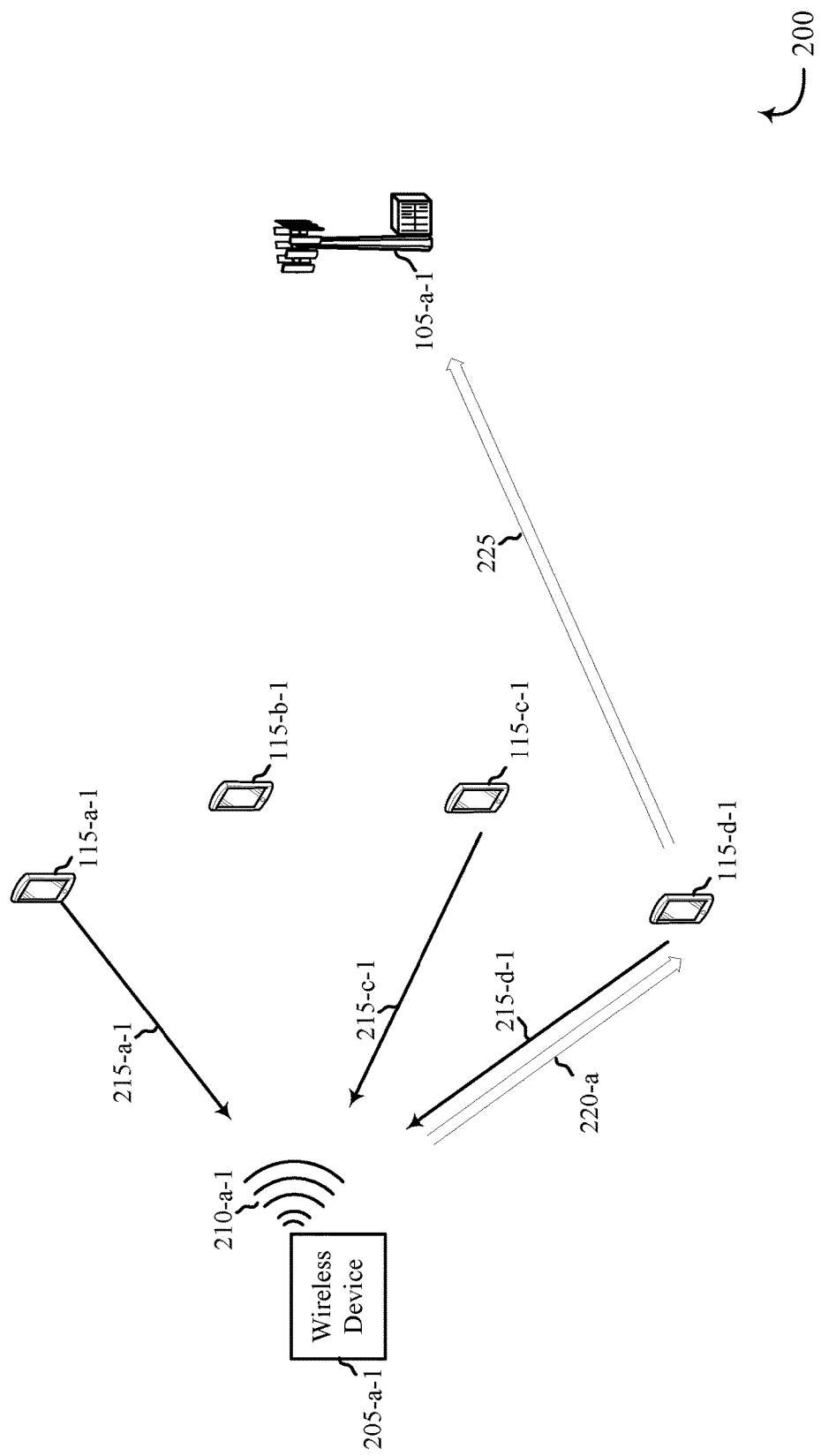
FIGS. 2A and 2B show examples of wireless communications systems for forwarding delay-tolerant traffic to a network in accordance with various aspects of the present disclosure.

FIG. 2A illustrates an example of a wireless communications system 200 for forwarding delay-tolerant traffic to a network in accordance with various aspects of the present disclosure. Wireless communications system 200 may include base station 105-*a*-1, UE 115-*a*-1, UE 115-*b*-1, UE 115-*c*-1, and UE 115-*d*-1 which may be examples of the corresponding devices described with reference to FIG. 1. Wireless communications system 200 may also include wireless device 205-*a*-1. Broadly, wireless communications system 200 illustrates an example where wireless device 205-*a*-1 transmits delay-tolerant messages to a UE 115 based in part on an evaluation of the ETNC of the UE 115. The evaluation may be performed by either the wireless device 205-*a*-1 or a selected UE 115. These messages are then forwarded to base station 105-*a*-1.

Wireless device 205-*a*-1 may include a variety of different devices. For example, wireless device 205-*a*-1 may be a sensor device, such as an environmental sensor, a mechanical sensor, a health monitoring sensor, and the like. As another example, wireless device 205-*a*-1 may be a wearable device such a smart watch, an IoT device, a fitness device, and the like. As yet another example, wireless device 205-*a*-1 may be another UE 115.

Wireless device 205-*a*-1 may have delay-tolerant message(s) (e.g., data, control information, etc.) to be forwarded to base station 105-*a*-1. Wireless device 205-*a*-1 may not have the means to transmit the delay-tolerant messages to base station 105-*a*-1 directly, so it may broadcast a message 210-*a*-1 to one or more UEs to indicate that it has delay-tolerant messages to be forwarded to base station 105-*a*-1. Broadcast message 210-*a*-1 may be transmitted via a low-power unlicensed air interface to a plurality of UEs. In one example, broadcast message 210-*a*-1 may comprise of a delay tolerance or deadline for when the delay-tolerant messages are to be sent to base station 105-*a*-1. UE 115-*a*-1, UE 115-*b*-1, UE 115-*c*-1, and UE 115-*d*-1 may receive broadcast message 210-*a*-1. These UEs 115 may send response messages 215 to wireless device 205-*a*-1 that may include their respective ETNCs. In some examples, when the broadcast message 210-*a*-1 includes a delay tolerance or deadline, the UEs 115 may only send a response message 215 if the UEs 115 are able to meet the delay tolerance or deadline. The ETNCs may be determined for an associated RAT using a history of contact with a network via that particular RAT. Each UE may maintain an ETNC for each respective RAT that the UE is capable of using. ETNCs may be based on supported access networks, mobility patterns, application traffic dynamics, or combinations thereof. Each UE 115 may broadcast its respective ETNC rather than including it in a response message 215.

In addition, the plurality of UEs may send response messages 215 to wireless device 205-*a*-1 that may include a calculated cost metric for an associated RAT. The cost metric may be based on monetary costs, UE resource usage, channel quality, or an existing connection a UE has with a network.

In this example, UE 115-*a*-1, UE 115-*c*-1, and UE 115-*d*-1 have sent respective response messages 215-*a*-1, 215-*c*-1, and 215-*d*-1 to wireless device 205-*a*-1. The UEs 115 may have compared their respective ETNCs to the delay tolerance or deadline received in broadcast message 210-*a*-1 and sent response messages 215 based on the comparison. Some UEs, for example UE 115-*b*-1, may choose not to send a response message to wireless device 205-*a*-1 for a variety of reasons which may include an inability to suitably forward the delay-tolerant messages within the given deadline.

In some examples, the broadcast message 210-*a*-1 may not include a delay-tolerance or deadline. In this case, the UEs 115 merely respond to the wireless device 205-*a*-1 with response messages 215 that include the respective ETNC of each UE 115 so that the wireless device 205-*a*-1 may decide on an appropriate UE 115 for forwarding a delay-tolerant message.

After evaluating one or more of response messages 215-*a*-1, 215-*c*-1, and 215-*d*-1 based on criteria such as each UE's ETNC and cost metrics, wireless device 205-*a*-1 may determine at least one UE 115 to which the delay-tolerant messages may be sent for forwarding to a network. Upon choosing at least one UE 115 from the plurality of available forwarding UEs, wireless device 205-*a*-1 may transmit the delay-tolerant messages in transmission 220-*a* to the chosen UE 115, in this case UE 115-*d*-1. Upon receiving the delay-tolerant messages, UE 115-*d*-1 may cache the messages until it is communicatively linked to base station 105-*a*-1. Upon successfully linking to base station 105-*a*-1, UE 115-*d*-1 may transmit the delay-tolerant messages to base station 105-*a*-1 via transmission 225. UE 115-*d*-1 may delete one or more of the delay-tolerant messages if UE 115-*d*-1 is not able to forward the messages to base station 105-*a*-1 within the messages' deadline or delay tolerance. Additionally, UE 115-*d*-1 may choose to keep one or more of the delay-tolerant messages cached after transmitting a portion of the messages to base station 105-*a*-1. This may occur if a cost metric associated with a particular delay-tolerant message is prohibitive for a given transmission.

Figure 2B:
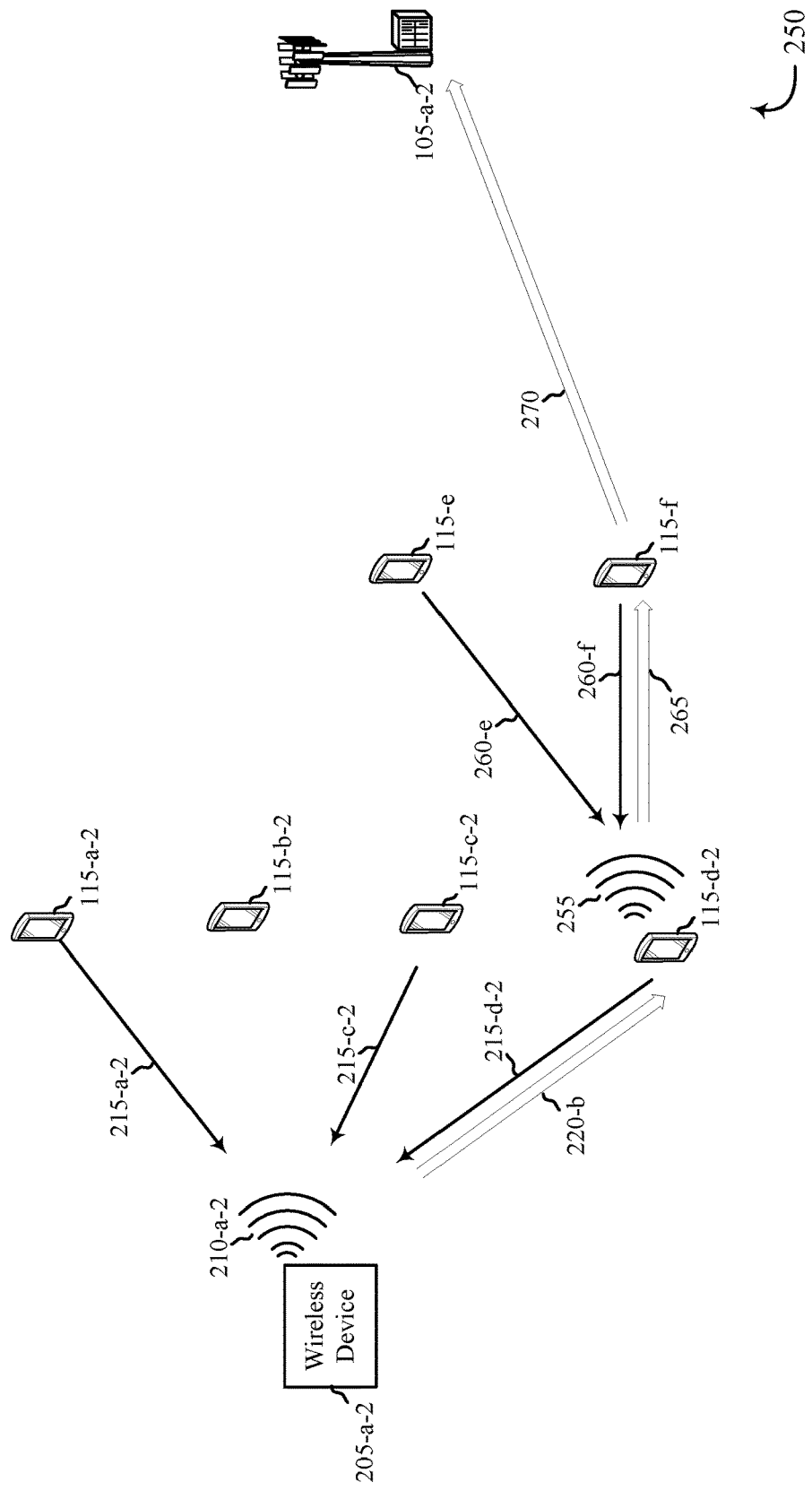

FIG. 2B illustrates an example of a wireless communications system 250 for forwarding delay-tolerant traffic to a network in accordance with various aspects of the present disclosure. Wireless communications system 250 may include base station 105-*a*-2, UE 115-*a*-2, UE 115-*b*-2, UE 115-*c*-2, and UE 115-*d*-2 which may be examples of the corresponding devices described with reference to FIG. 1. Wireless communications system 250 may also include wireless device 205-*a*-2. Broadly, wireless communications system 250 illustrates an example where wireless device 205-*a*-2 transmits delay-tolerant messages to a UE 115 based in part on an evaluation of the ETNC of the UE 115. These messages are then forwarded to base station 105-*a*-2 via multiple UEs 115.

Wireless device 205-*a*-2 may have delay-tolerant message(s) (e.g., data, control information, etc.) to be forwarded to base station 105-*a*-2. Wireless device 205-*a*-2 may not have the means to transmit the delay-tolerant messages to base station 105-*a*-2 directly, so it may broadcast a message 210-*a*-2 to one or more UEs to indicate that it has delay-tolerant messages to be forwarded to base station 105-*a*-2. Broadcast message 210-*a*-2 may be transmitted via a low-power unlicensed air interface to a plurality of UEs. Broadcast message 210-*a*-2 may comprise of a delay tolerance or deadline for when the delay-tolerant messages are to be sent to base station 105-*a*-2. UE 115-*a*-2, UE 115-*b*-2, UE 115-*c*-2, and UE 115-*d*-2 may receive broadcast message 210-*a*-2. These UEs may send response messages 215 to wireless device 205-*a*-2 that may include their respective ETNCs. In addition, the plurality of UEs may send response messages 215 to wireless device 205-*a*-2 that may include a calculated cost metric for an associated RAT.

In this example, UE 115-*a*-2, UE 115-*c*-2, and UE 115-*d*-2 have sent respective response messages 215-*a*-2, 215-*c*-2, and 215-*d*-2 to wireless device 205-*a*-2. These UEs 115 may have compared their respective ETNCs to the delay tolerance or deadline received in broadcast message 210-*a*-2 and sent response messages 215 based on the comparison. Some UEs, for example UE 115-*b*-2, may choose not to send a response message to wireless device 205-*a*-1 for a variety of reasons which may include an inability to suitably forward the delay-tolerant messages within the given deadline.

In some examples, the broadcast message 210-*a*-2 may not include a delay-tolerance or deadline. In this case, the UEs 115 merely respond to the wireless device 205-*a*-2 with response messages 215 that include the respective ETNC of each UE 115 so that the wireless device 205-*a*-2 may decide on an appropriate UE 115 for forwarding a delay-tolerant message.

After evaluating one or more of response messages 215-*a*-2, 215-*c*-2, and 215-*d*-2 based on criteria such as each UE's ETNC and cost metrics, wireless device 205-*a*-2 may determine at least one UE 115 to which the delay-tolerant messages may be sent for forwarding to a network. Upon choosing at least one UE 115 from the plurality of available forwarding UEs, wireless device 205-*a*-2 may transmit the delay-tolerant messages in transmission 220-*b* to the chosen UE 115, in this case UE 115-*d*-2. Upon receiving the delay-tolerant messages, UE 115-*d*-2 may cache the messages until it is communicatively linked to base station 105-*a*-2.

In certain instances, UE 115-*d*-2 may forward the received delay-tolerant messages to a subsequent forwarding UE 115 for forwarding to a network. This situation may occur if UE 115-*d*-2 determines that it is unlikely or unable to forward the delay-tolerant messages to base station 105-*a*-2. In this example, UE 115-*d*-2 may broadcast a message 255 to one or more UEs to indicate that it has delay-tolerant messages to be forwarded to a network (the subsequent forwarding UEs 115 may utilize a base station other than base station 105-*a*-2). Broadcast message 255 may comprise of a delay tolerance or deadline for when the delay-tolerant messages are to be sent to the network. UE 115-*e* and UE 115-*f* may receive broadcast message 255. UE 115-*e* and UE 115-*f* may send response messages 260-*e* and 260-*f*, respectively, to UE 115-*d*-2 that may include their respective ETNCs. In addition, UE 115-*e* and UE 115-*f* may send response messages 260-*e* and 260-*f* to UE 115-*d*-2 that may include a calculated cost metric for an associated RAT.

After evaluating one or more of response messages 260-*e* and 260-*f* based on criteria such as each UE's ETNC and cost metrics, UE 115-*d*-2 may determine at least one UE 115 to which the delay-tolerant messages may be sent in order for them to be forwarded to a network. Upon choosing at least one UE 115 from the plurality of available forwarding UEs, UE 115-*d*-2 may transmit the delay-tolerant messages in transmission 265 to the chosen UE 115, in this case UE 115-*f* Upon receiving the delay-tolerant messages, UE 115-*f* may cache the messages until it is communicatively linked to base station 105-*a*-2. Upon successfully linking to base station 105-*a*-2, UE 115-*f* may transmit the delay-tolerant messages to base station 105-*a*-2 via transmission 270. UE 115-*f* may delete one or more of the delay-tolerant messages if UE 115-*f* is not able to forward the messages to base station 105-*a*-2 within the messages' deadline or delay tolerance. Additionally, UE 115-*f* may choose to keep one or more of the delay-tolerant messages cached after transmitting a portion of the messages to base station 105-*a*-2. This may occur if a cost metric associated with a particular delay-tolerant message is prohibitive for a given transmission.

Figure 3A:
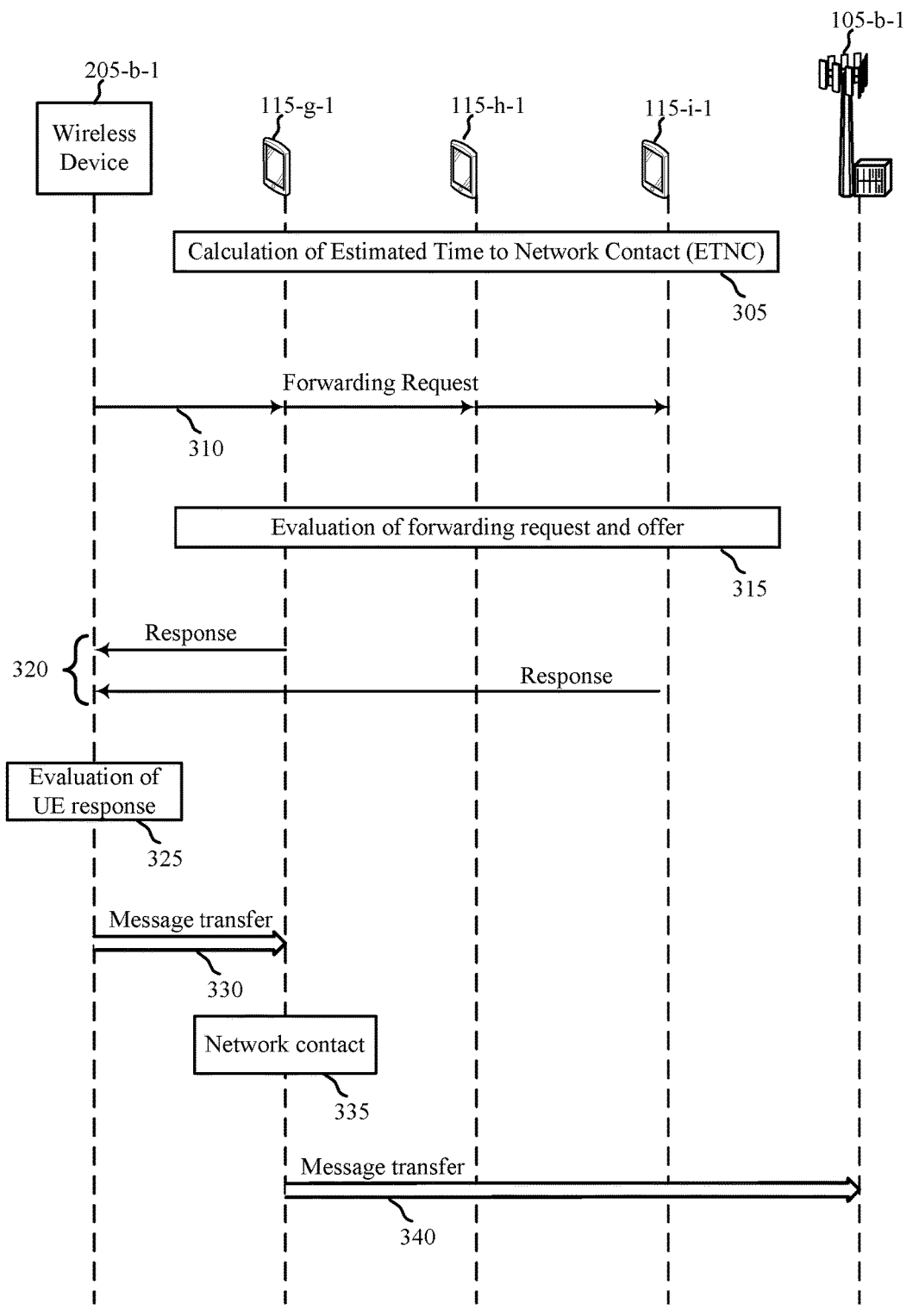
FIGS. 3A and 3B show process flows for forwarding delay-tolerant traffic to a network in accordance with various aspects of the present disclosure.

FIG. 3A shows a process flow 300 for forwarding delay-tolerant traffic to a network in accordance with various aspects of the present disclosure. The operations of process flow 300 may be implemented by a device such as a UE 115, base station 105, and wireless device 205 as described with reference to FIGS. 1-2B. Generally, process flow 300 illustrates an example where wireless device 205-*b*-1 transmits delay-tolerant messages to a UE 115 based in part on an evaluation of the ETNC of the UE 115. These messages are then forwarded to base station 105-*b*-1.

At step 305, UE 115-*g*-1, UE 115-*h*-1, and UE 115-*i*-1 may each calculate an ETNC. The ETNCs may be determined for an associated RAT using a history of contact with a network via that particular RAT. Each UE may maintain a ETNC for each respective RAT that the UE is capable of using. ETNCs may be based on supported access networks, mobility patterns, application traffic dynamics, or combinations thereof. In certain instances, the plurality of UEs may broadcast their respective ETNCs (not shown).

Wireless device 205-*b*-1 may send a forwarding request 310 to UE 115-*g*-1, UE 115-*h*-1, and UE 115-*i*-1 for forwarding delay-tolerant messages to base station 105-*b*-1. Wireless device 205-*b*-1 may send the request using a transmission protocol such as Bluetooth low energy (BLE), WiFi Aware, Long Term Evolution (LTE) Direct, or LTE Proximity Services. Request 310 may be a broadcast message that wireless device 205-*b*-1 broadcasts to a plurality of UEs. The request 310 may comprise of a delay tolerance or deadline for when the delay-tolerant messages are to be sent to base station 105-*b*-1. Upon receiving forwarding request 310, the plurality of UEs may determine whether to transmit a response message to wireless device 205-*b*-1 at step 315. Determining whether to transmit a response message may be based on a calculated ETNC or cost metric. The determining may also be based on comparing a UE's ETNC with the delay tolerance or deadline. In some embodiments, the plurality of UEs 115 may determine an offer to present to wireless device 205-*b*-1 in exchange for forwarding a delay-tolerant message to base station 105-*b*-1. This offer may be determined based on the UE's own calculated cost metric for forwarding a delay-tolerant message to base station 105-*b*-1.

At least one of the plurality of UEs 115 may transmit a message 320 to wireless device 205-*b*-1 in response to forwarding request 310. In this example, UE 115-*g*-1 and UE 115-*i*-1 have transmitted response messages 320 to wireless device 205-*b*-1. The response messages 320 may include each UE's respective ETNC. The response messages 320 may also include each UE's respective cost metric and/or determined offers.

Upon receiving response messages 320, wireless device 205-*b*-1 may evaluate the messages to determine a suitable forwarding UE at step 325. The evaluation process may comprise of a variety of factors including whether the delay-tolerant messages will be forwarded to base station 105-*b*-1 within a deadline, a probability that the delay-tolerant messages are forwarded within the deadline, whether the offer proposed by the UE 115 is cost-effective, whether each UE's cost metrics are not prohibitive, etc. Each factor considered by wireless device 205-*b*-1 may be weighted in equal or different proportions. When the wireless device 205-*b*-1 determines suitable UEs for delay-tolerant message forwarding, wireless device 205-*b*-1 may transmit the messages to the selected one or more UEs in message transfer 330. In this example, wireless device 205-*b*-1 has chosen UE 115-*g*-1 for receiving the delay-tolerant messages. In some embodiments, wireless device 205-*b*-1 may determine that a plurality of UEs are suitable candidates for message forwarding and may transmit delay-tolerant messages to the plurality of UEs. In some embodiments, duplicate delay-tolerant messages are transmitted to the suitable forwarding candidates.

After receiving the delay-tolerant messages in transfer 330, UE 115-*g*-1 may cache the messages until its next contact with its serving network (not shown). At step 335, UE 115-*g*-1 may contact base station 105-*b*-1 and establish a data communications link. Upon successfully linking with base station 105-*b*-1, UE 115-*g*-1 may transfer the delay-tolerant messages to base station 105-*b*-1 in message transfer 340.

Figure 3B:
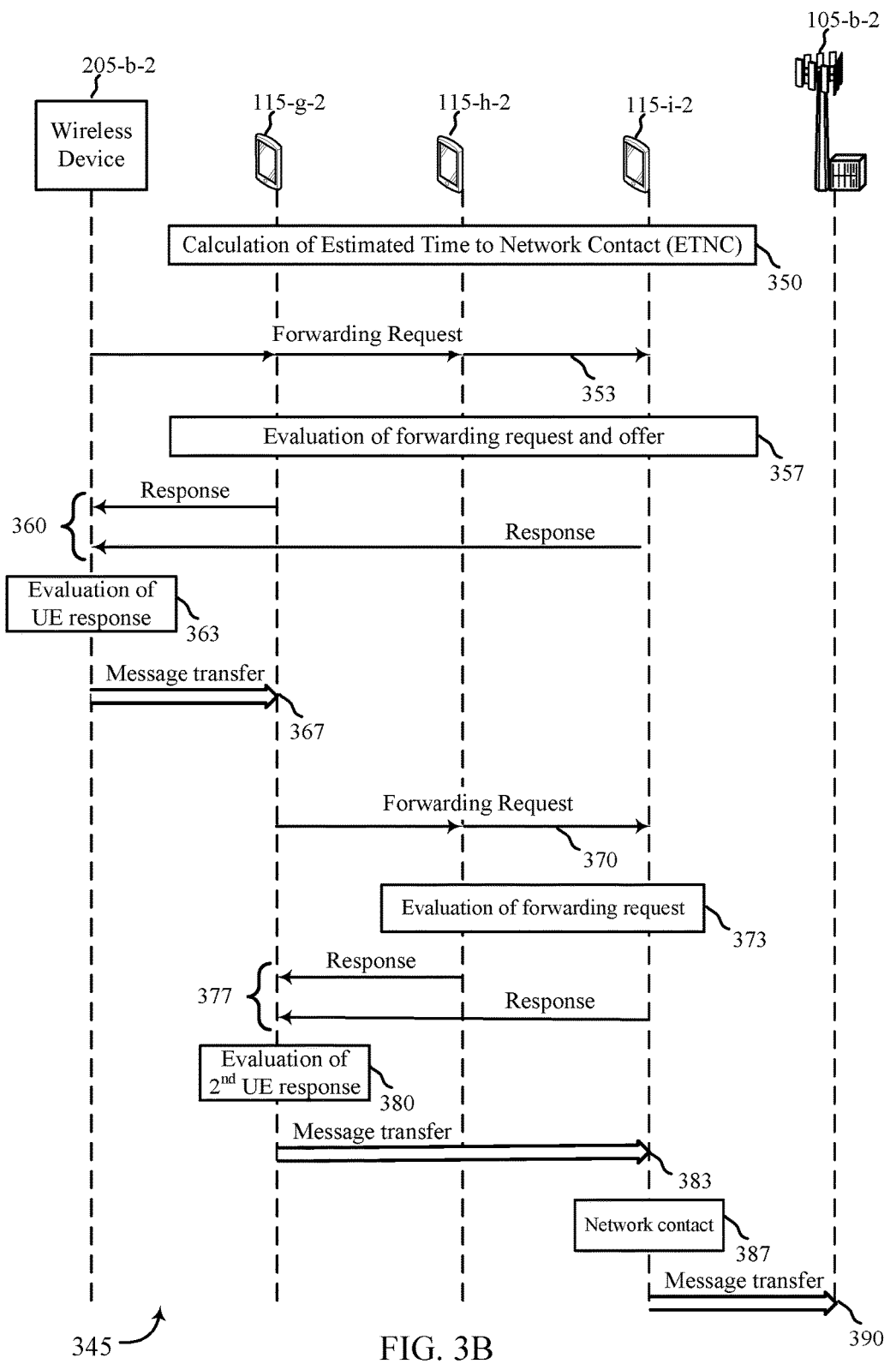

FIG. 3B shows a process flow 345 for network selection for forwarding delay-tolerant traffic to a network in accordance with various aspects of the present disclosure. The operations of process flow 345 may be implemented by a device such as a UE 115, base station 105, and wireless device 205 as described with reference to FIGS. 1-2B. Generally, process flow 345 illustrates an example where wireless device 205-b-2 transmits delay-tolerant messages to a UE 115 based in part on an evaluation of the ETNC of the UE 115. These messages are then forwarded to base station 105-b-2.

At step 305, UE 115-g-2, UE 115-h-2, and UE 115-i-2 may each calculate an ETNC. In certain instances, the plurality of UEs may broadcast their respective ETNCs (not shown). Wireless device 205-b-2 may send a forwarding request 353 to UE 115-g-2, UE 115-h-2, and UE 115-i-2 for forwarding delay-tolerant messages to base station 105-b-2. Request 353 may be a broadcast message that wireless device 205-b-2 broadcasts to a plurality of UEs. The request 353 may comprise of a delay tolerance or deadline for when the delay-tolerant messages are to be sent to base station 105-b-2. Upon receiving forwarding request 353, the plurality of UEs may determine whether to transmit a response message to wireless device 205-b-2 at step 357. Determining whether to transmit a response message may be based on a calculated ETNC or cost metric. The determining may also be based on comparing a UE's ETNC with the delay tolerance or deadline. In some embodiments, the plurality of UEs 115 may determine an offer to present to wireless device 205-b-2 in exchange for forwarding a delay-tolerant message to base station 105-b-2.

At least one of the plurality of UEs 115 may transmit a message 360 to wireless device 205-b-2 in response to forwarding request 353. In this example, UE 115-g-2 and UE 115-i-2 have transmitted response messages 360 to wireless device 205-b-2. The response messages 360 may include each UE's respective ETNC. The response messages 360 may also include each UE's respective cost metric and/or determined offers.

Upon receiving response messages 360, wireless device 205-b-2 may evaluate the messages to determine a suitable forwarding UE at step 363. The evaluation process may comprise of a variety of factors including whether the delay-tolerant messages will be forwarded to base station 105-b-2 within a deadline, a probability that the delay-tolerant messages are forwarded within the deadline, whether the offer proposed by the UE 115 is cost-effective, whether each UE's cost metrics are not prohibitive, etc. Each factor considered by wireless device 205-b-2 may be weighted in equal or different proportions. When the wireless device 205-b-2 determines suitable UEs for delay-tolerant message forwarding, wireless device 205-b-2 may transmit the messages to the selected one or more UEs in message transfer 367. In this example, wireless device 205-b-2 has chosen UE 115-g-2 for receiving the delay-tolerant messages. In some embodiments, wireless device 205-b-2 may determine that a plurality of UEs are suitable candidates for message forwarding and may transmit delay-tolerant messages to the plurality of UEs. In some embodiments, duplicate delay-tolerant messages are transmitted to the suitable forwarding candidates.

After receiving the delay-tolerant messages in transfer 367, UE 115-g-2 may cache the messages (not shown). In certain circumstances, UE 115-g-2 may be unable to forward the delay-tolerant messages to base station 105-b-2 or it may determine that another UE 115 may be better suited to forward the messages. Under these scenarios, UE 115-g-2 may send a forwarding request 370 to UE 115-h-2 and UE 115-i-2 for forwarding delay-tolerant messages to base station 105-b-2. Request 370 may be a broadcast message that UE 115-g-2 broadcasts to a plurality of UEs. The request 370 may comprise of a delay tolerance or deadline for when the delay-tolerant messages are to be sent to base station 105-b-2. This delay tolerance or deadline in request 370 may be the same as the delay tolerance or deadline transmitted in forwarding request 353, or the deadline may be altered by UE 115-g-2.

Upon receiving forwarding request 370, the plurality of UEs may determine whether to transmit a response message to UE 115-g-2 at step 373. Determining whether to transmit a response message may be based on a calculated ETNC or cost metric. The calculated ETNC may be the same as the ETNC calculated in step 350 or it may be recalculated at step 373. The calculated cost metric may be the same as the cost metric calculated in step 357 or it may be recalculated at step 373. The determining may also be based on comparing a UE's ETNC with the previous or adjusted delay tolerance or deadline.

At least one of the plurality of UEs 115 may transmit a message 377 to UE 115-g-2 in response to forwarding request 370. In this example, UE 115-h-2 and UE 115-i-2 have transmitted response messages 377 to UE 115-g-2. The response messages 377 may include each UE's respective ETNC. The response messages 377 may also include each UE's respective cost metric and/or determined offers.

Upon receiving response messages 377, UE 115-g-2 may evaluate the messages to determine a suitable forwarding UE at step 380. The evaluation process may comprise of a variety of factors including whether the delay-tolerant messages will be forwarded to base station 105-b-2 within a deadline, a probability that the delay-tolerant messages are forwarded within the deadline, whether the offer proposed by the UE 115 is cost-effective, whether each UE's cost metrics are not prohibitive, etc. Each factor considered by UE 115-g-2 may be weighted in equal or different proportions. When UE 115-g-2 determines suitable UEs for delay-tolerant message forwarding, UE 115-g-2 may transmit the messages to the selected one or more UEs in message transfer 383. In this example, UE 115-g-2 has chosen UE 115-i-2 for receiving the delay-tolerant messages. In some embodiments, UE 115-g-2 may determine that a plurality of UEs are suitable candidates for message forwarding and may transmit delay-tolerant messages to the plurality of UEs. In some embodiments, duplicate delay-tolerant messages are transmitted to the suitable forwarding candidates.

After receiving the delay-tolerant messages in transfer 383, UE 115-i-2 may cache the messages until its next contact with its serving network (not shown). At step 387, UE 115-i-2 may contact base station 105-b-2 and establish a data communications link. Upon successfully linking with base station 105-b-2, UE 115-i-2 may transfer the delay-tolerant messages to base station 105-b-2 in message transfer 390.

Figure 4:
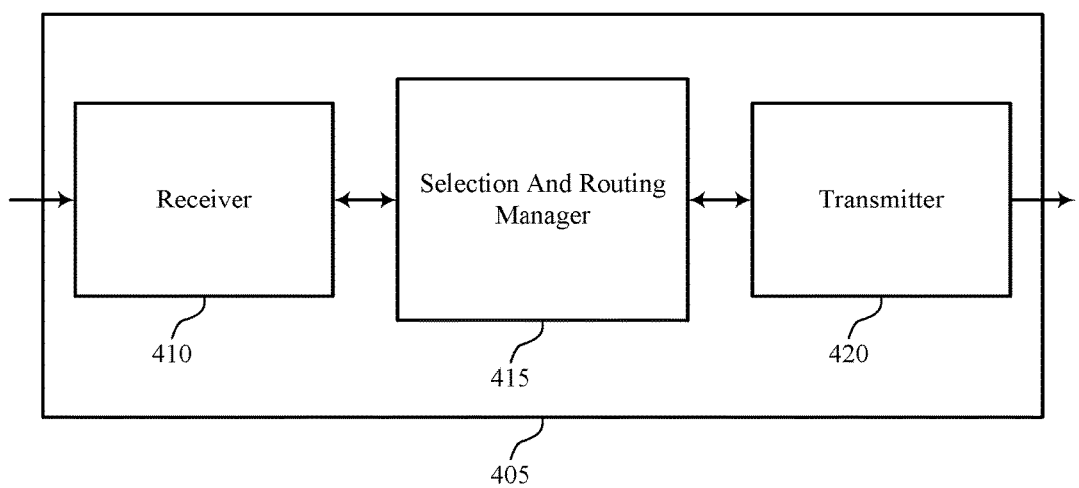
FIGS. 4-6 show block diagrams of a device configured for use in wireless communication, in accordance with various aspects of the present disclosure.

FIG. 4 shows a block diagram 400 of a wireless device 405 that supports forwarding node selection and routing for delay-tolerant messages in accordance with various aspects of the present disclosure. Wireless device 405 may be an example of aspects of a UE 115 as described with reference to FIGS. 1-3B or a wireless device 205 as described with reference to FIGS. 2A-3B. Wireless device 405 may include receiver 410, selection and routing manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to forwarding node selection and routing for delay-tolerant messages, etc.). Information may be passed on to other components of the device. The receiver 410 may be an example of aspects of the transceiver 735 described with reference to FIG. 7.

Selection and routing manager 415 may be an example of aspects of the selection and routing manager 715 described with reference to FIG. 7.

When the wireless device 405 is a UE 115, selection and routing manager 415 may receive a request indicating that a wireless device has one or more delay-tolerant messages to be forwarded to a network, send a response message to the wireless device indicative of an estimated time to network contact, receive and cache the one or more delay-tolerant messages to be forwarded, and forward at least one of the one or more delay-tolerant messages. When the wireless device 405 is a wireless device 205 (such as an IoT device), the selection and routing manager 415 may send a request indicating that the wireless device has one or more delay-tolerant messages to be forwarded to a network, receive one or more response messages from a corresponding one or more UEs, the one or more response messages each indicative of an estimated time to network contact for corresponding UEs, evaluate the one or more response messages to determine at least one of the one or more UEs to which the one or more delay-tolerant messages may be sent in order to be forwarded to the network, and transmit the one or more delay-tolerant messages to the at least one of the one or more UEs. The selection and routing manager 415 may also send, from a wireless device, a request indicating that the wireless device has one or more delay-tolerant messages to be forwarded to a network, the request including a delay tolerance or a deadline for when the one or more delay-tolerant messages are to be forwarded to the network, receive one or more response messages from a corresponding one or more UEs, and transmit the one or more delay-tolerant messages to the at least one of the one or more UEs.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may include a single antenna, or it may include a set of antennas.

Figure 5:
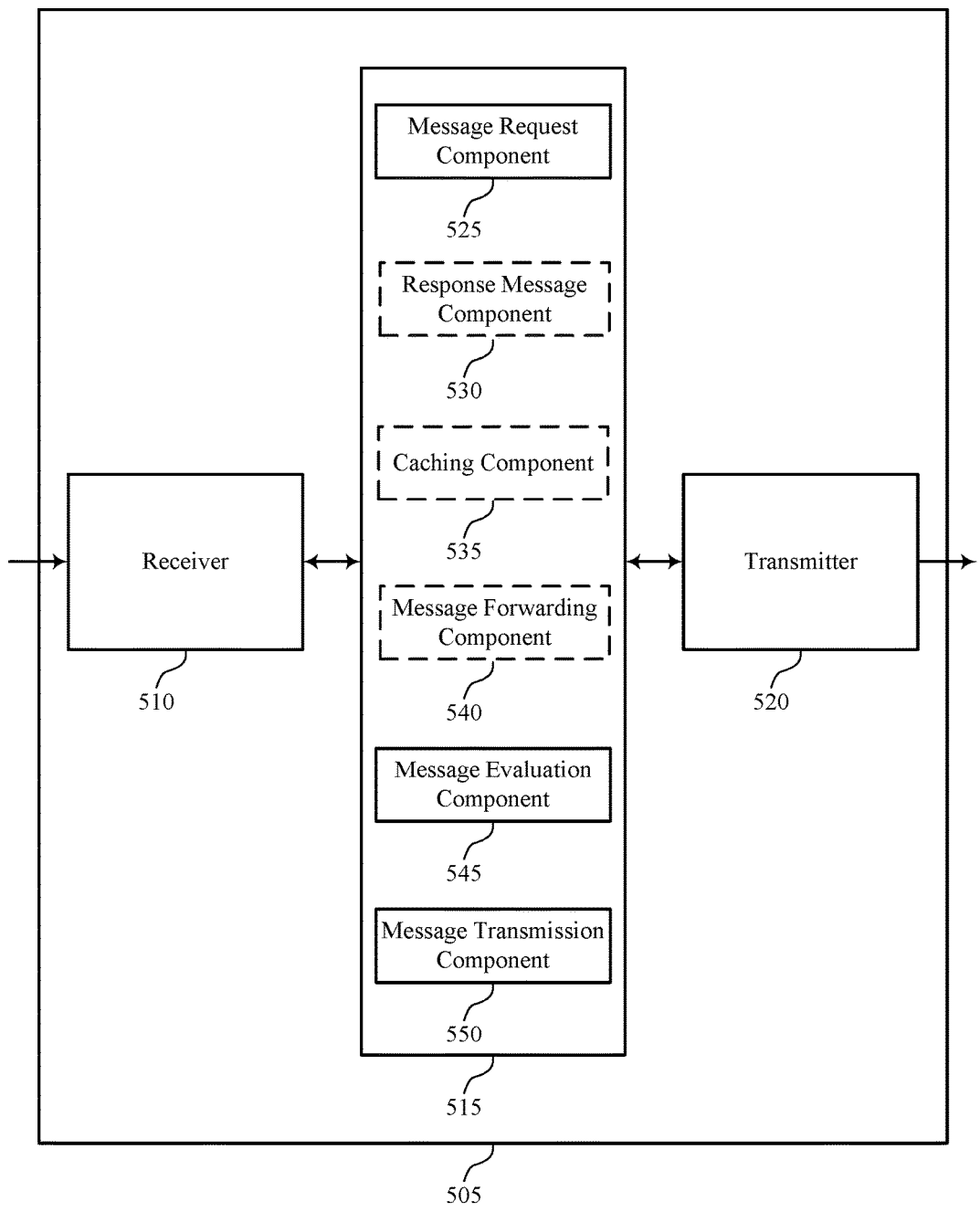

FIG. 5 shows a block diagram 500 of a wireless device 505 that supports forwarding node selection and routing for delay-tolerant messages in accordance with various aspects of the present disclosure. Wireless device 505 may be an example of aspects of a wireless device 405, a UE 115, or a wireless device 205 as described with reference to FIGS. 1-4. Wireless device 505 may include receiver 510, selection and routing manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to forwarding node selection and routing for delay-tolerant messages, etc.). Information may be passed on to other components of the device. The receiver 710 may be an example of aspects of the transceiver 735 described with reference to FIG. 7.

Selection and routing manager 515 may be an example of aspects of the selection and routing manager 415 described with reference to FIG. 4. Selection and routing manager 515 may also be an example of aspects of the selection and routing manager 715 described with reference to FIG. 7.

Selection and routing manager 515 may include message request component 525, response message component 530, caching component 535, message forwarding component 540, message evaluation component 545, and message transmission component 550.

In some cases, device 505 can be a UE 115. In those cases, message request component 525 may receive, when wireless device 505 is a UE, a request indicating that a wireless device 205 has one or more delay-tolerant messages to be forwarded to a network. Response message component 530 may send a response message to the wireless device 205 indicative of an estimated time to network contact. In some cases, the one or more response messages further include a cost metric, where the cost metric is based on at least one of: monetary costs, UE resource usage, channel quality, or an existing connection a UE has with the network. In some cases, the one or more response messages include one or more broadcast messages received from the one or more UEs.

Caching component 535 may cache the one or more delay-tolerant messages to be forwarded and delete one or more of the delay-tolerant messages based on the one or more of the delay-tolerant messages not being forwarded within the delay tolerance or within the deadline. In some cases, at least one of the one or more delay-tolerant messages remains cached based on the calculated cost metric. Message forwarding component 540 may forward at least one of the one or more delay-tolerant messages to a UE or a network.

Message transmission component 550 may transmit the one or more delay-tolerant messages to the at least one UE 115. Message transmission component 550 may transmit the one or more delay-tolerant messages to a network.

In some cases, device 505 can be an example of wireless device 205. In those cases message request component 525 may send a request indicating that the wireless device 505 has one or more delay-tolerant messages to be forwarded to a network. In some cases, the request includes a delay tolerance or a deadline for when the one or more delay-tolerant messages are to be sent to the network.

Message evaluation component 545 may evaluate the one or more response messages to determine at least one UE to which the delay-tolerant messages may be sent in order to be forwarded to the network. In some cases, evaluating the one or more response messages further includes: determining a probability that the one or more delay-tolerant messages will be forwarded to the network within a delay tolerance or before a deadline. In some cases, the one or more evaluation parameters include a cost metric, where the cost metric is based on at least one of: monetary costs, UE resource usage, channel quality, or an existing connection a UE has with the network. In some cases, the one or more evaluation parameters include an estimated time to network contact for the corresponding UE, where the estimated time to network contact is based on at least one of: supported access networks, mobility patterns, application traffic dynamics, or combinations thereof. In some cases, evaluating the one or more response messages further includes: determining a probability that the one or more delay-tolerant messages will be forwarded to the network within the delay tolerance or before the deadline.

Message transmission component 550 may transmit the one or more delay-tolerant messages from wireless device 205 to at least one UE 115. In some cases, sending the request includes using a transmission protocol that is one of: BLE, WiFi Aware, LTE Direct, or LTE Proximity Services.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may include a single antenna, or it may include a set of antennas.

Figure 6:
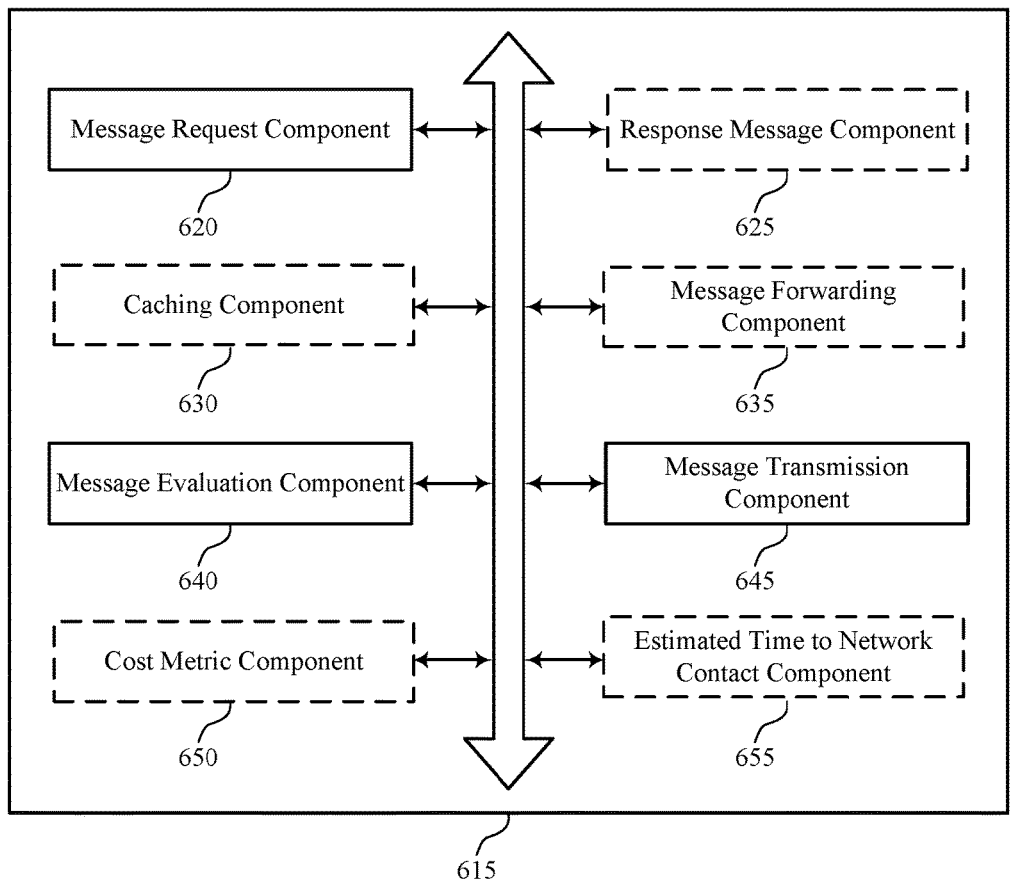

FIG. 6 shows a block diagram 600 of a selection and routing manager 615 that supports forwarding node selection and routing for delay-tolerant messages in accordance with various aspects of the present disclosure. The selection and routing manager 615 may be an example of aspects of a selection and routing manager 415, a selection and routing manager 515, or a selection and routing manager 715 described with reference to FIGS. 4, 5, and 7. The selection and routing manager 615 may include message request component 620, response message component 625, caching component 630, message forwarding component 635, message evaluation component 640, message transmission component 645, cost metric component 650, and time estimation component 655. Each of these modules may communicate, directly or indirectly, with one another (e.g., via one or more buses).

In some cases, selection and routing manager 615 may be utilized by a UE 115. In those cases, message request component 620 may receive a request indicating that a wireless device 205 has one or more delay-tolerant messages to be forwarded to a network. Response message component 625 may send a response message to the wireless device 205 indicative of an estimated time to network contact. In some cases, the one or more response messages further include a cost metric, where the cost metric is based on at least one of: monetary costs, UE resource usage, channel quality, or an existing connection a UE has with the network. In some cases, the one or more response messages include one or more broadcast messages received from the one or more UEs.

Caching component 630 may cache the one or more delay-tolerant messages to be forwarded and delete one or more of the delay-tolerant messages based on the one or more of the delay-tolerant messages not being forwarded within the delay tolerance or within the deadline. In some cases, at least one of the one or more delay-tolerant messages remains cached based on the calculated cost metric. Message forwarding component 635 may forward at least one of the one or more delay-tolerant messages to a UE or a network.

Cost metric component 650 may calculate a cost metric for at least one RAT, where the cost metric is based on at least one of: monetary costs, UE resource usage, channel quality, or an existing connection a UE has with the network.

Estimated time to network contact component 655 may determine, by a UE 115, the estimated time to network contact by using a history of contact with the network via at least one RAT. In some cases the estimated time to network contact component 655 may maintain the determined estimated time to network contact for each respective RAT that the UE is capable of using. In some cases the estimated time to network contact component 655 may broadcast a message indicating an estimated time to network contact. In some cases, the estimated time to network contact is based on at least one of: supported access networks, mobility patterns, application traffic dynamics, or combinations thereof.

In some cases, selection and routing manager 615 may be utilized by a wireless device 205. In those cases message request component 620 may send a request indicating that the wireless device 205 has one or more delay-tolerant messages to be forwarded to a network. In some cases, the request includes a delay tolerance or a deadline for when the one or more delay-tolerant messages are to be sent to the network.

Message evaluation component 640 may evaluate the one or more response messages to determine at least one UE to which the delay-tolerant messages may be sent in order to be forwarded to the network. In some cases, evaluating the one or more response messages further includes: determining a probability that the one or more delay-tolerant messages will be forwarded to the network within a delay tolerance or before a deadline. In some cases, the one or more evaluation parameters include a cost metric, where the cost metric is based on at least one of: monetary costs, UE resource usage, channel quality, or an existing connection a UE has with the network. In some cases, the one or more evaluation parameters include an estimated time to network contact for the corresponding UE, where the estimated time to network contact is based on at least one of: supported access networks, mobility patterns, application traffic dynamics, or combinations thereof. In some cases, evaluating the one or more response messages further includes: determining a probability that the one or more delay-tolerant messages will be forwarded to the network within the delay tolerance or before the deadline.

Message transmission component 645 may transmit the one or more delay-tolerant messages to the at least one UE 115. In some cases, sending the request includes using a transmission protocol that is one of: BLE, WiFi Aware, LTE Direct, or LTE Proximity Services.

Figure 7:
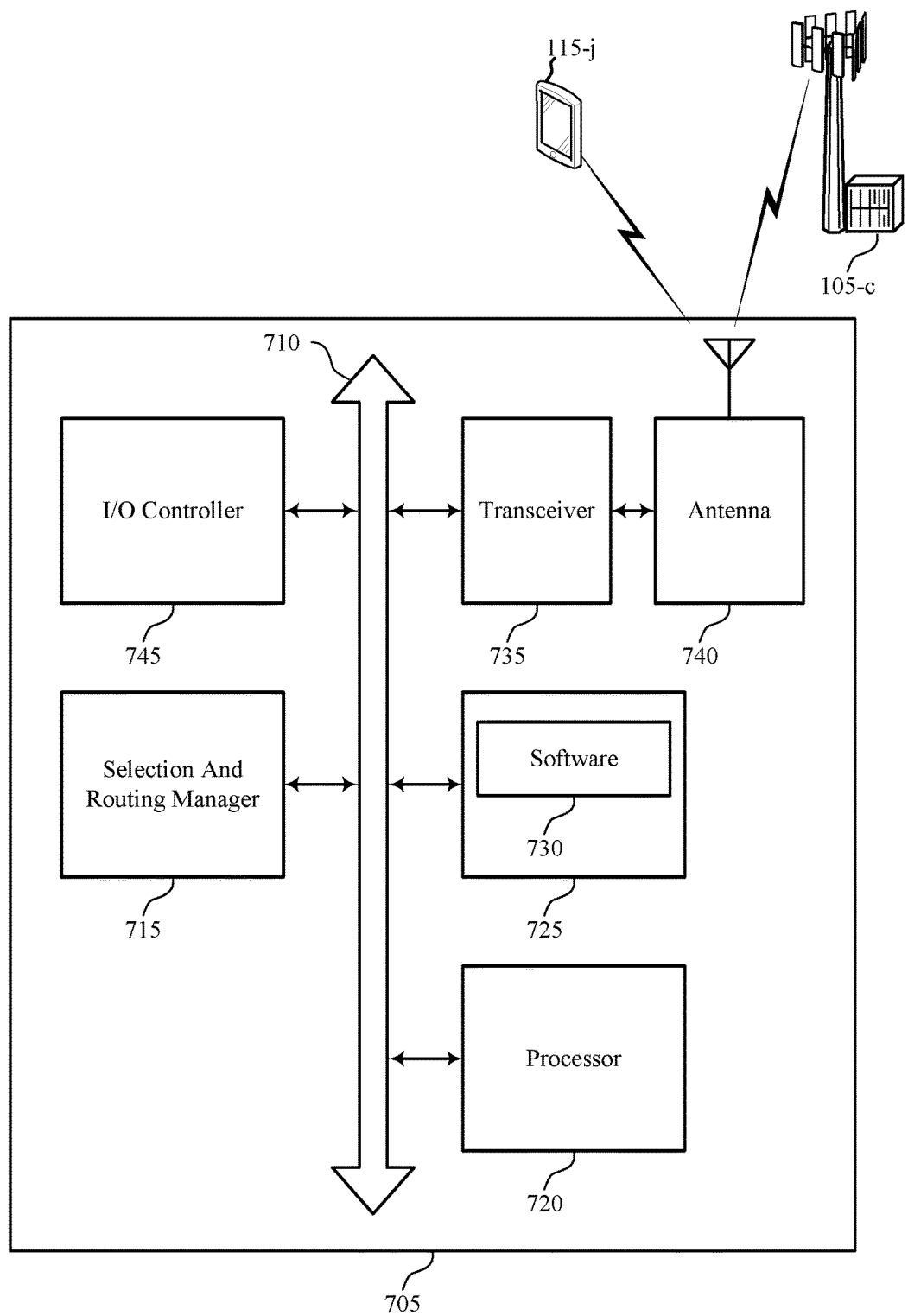
FIG. 7 shows a block diagram of a wireless communication system, in accordance with various aspects of the present disclosure.

FIG. 7 shows a diagram of a system 700 including a device 705 that supports forwarding node selection and routing for delay-tolerant messages in accordance with various aspects of the present disclosure. Device 705 may be an example of or include the components of wireless device 405, wireless device 505, a wireless device 205, or a UE 115 as described above, e.g., with reference to FIGS. 1-5.

Device 705 may include components for bi-directional voice and data communications including components for transmitting and receiving communications, including selection and routing manager 715, processor 720, memory 725, software 730, transceiver 735, antenna 740, and I/O controller 745.

Processor 720 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting forwarding node selection and routing for delay-tolerant messages).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a Basic Input-Output system (BIOS) which may control basic hardware and/or software operation such as the interaction with peripheral components or devices.

Software 730 may include code to implement aspects of the present disclosure, including code to support forwarding node selection and routing for delay-tolerant messages. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas.

In some cases, the wireless device may include a single antenna 740. However, in some cases the device may have more than one antenna 740, which may be capable of concurrently transmitting or receiving multiple wireless transmissions. When device 705 is an example of UE 115, device 705 may receive, at antenna 740, a request indicating that a wireless device has one or more delay-tolerant messages to be forwarded to a network. It may also use antenna 705 to send a response message to the wireless device indicative of an estimated time to network contact. Additionally, when device 705 is an example of UE 115, it may use antenna 705 to forward at least one or more delay-tolerant messages to a base station 105-c.

When device 705 is an example of a wireless device 205, device 705 may send a request indicating that the wireless device 205 has one or more delay-tolerant messages to be forwarded to a network. It may also use antenna 705 to receive a response message indicative of an estimated time to network contact. Additionally, when device 705 is an example of wireless device 205, it may use antenna 705 to forward at least one or more delay-tolerant messages to a UE 115-j.

I/O controller 745 may manage input and output signals for device 705. Input/output control component 745 may also manage peripherals not integrated into device 705. In some cases, input/output control component 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system.

Figure 8:
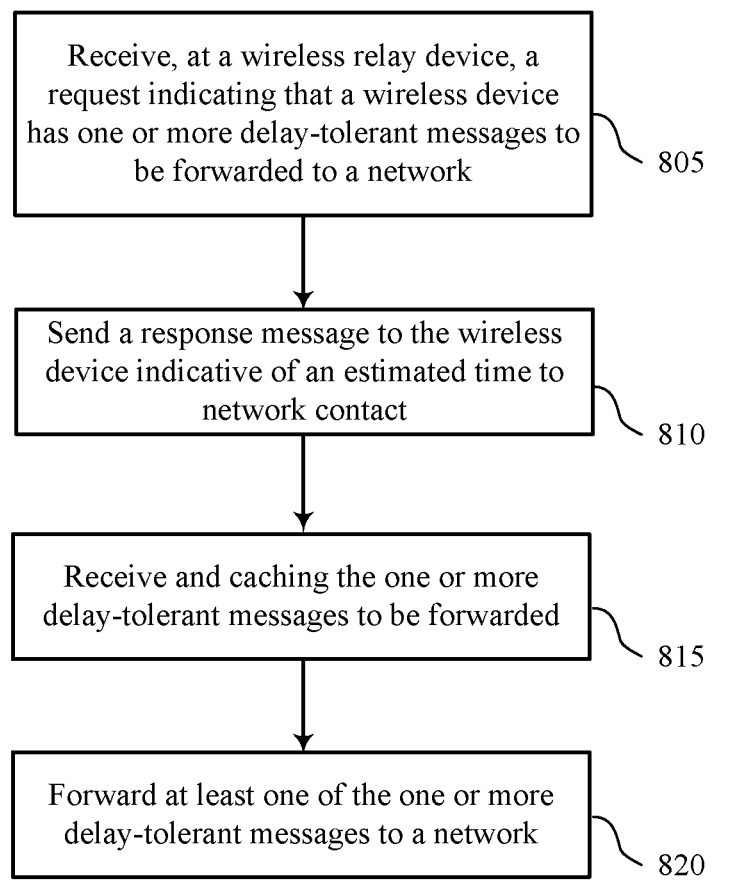
FIGS. 8-11 are flow charts illustrating examples of methods for wireless communication, in accordance with various aspects of the present disclosure.

FIG. 8 shows a flowchart illustrating a method 800 for forwarding node selection and routing for delay-tolerant messages in accordance with various aspects of the present disclosure. The operations of method 800 may be implemented by a wireless relay device, such as a UE 115 or its components as described herein. For example, the operations of method 800 may be performed by a selection and routing manager as described with reference to FIGS. 4 through 7. In some examples, a UE 115 may execute a set of codes to control the functional elements of the device to perform the functions described below. Additionally or alternatively, the UE 115 may perform aspects the functions described below using special-purpose hardware.

At block 805, the wireless relay device may receive a request indicating that a wireless device has one or more delay-tolerant messages to be forwarded to a network. The request may comprise a delay tolerance or a deadline for when the one or more delay-tolerant messages are to be sent to the network. The operations of block 805 may be performed according to the methods described with reference to FIGS. 1 through 3B. In certain examples, aspects of the operations of block 805 may be performed by a message request component as described with reference to FIGS. 4 through 7.

At block 810, the wireless relay device may send a response message to the wireless device indicative of an estimated time to network contact. The response message may include the estimated time to network contact. The operations of block 815 may be performed according to the methods described with reference to FIGS. 1 through 3B. In certain examples, aspects of the operations of block 815 may be performed by a response message component as described with reference to FIGS. 4 through 7.

At block 815, the wireless relay device may receive and cache the one or more delay-tolerant messages to be forwarded. In some instances, the wireless relay device may delete one or more of the delay-tolerant messages based at least in part on the one or more of the delay-tolerant messages not being forwarded within the delay tolerance or within the deadline. Also, the wireless relay device may allow for one or more delay-tolerant messages to remain cached based at least in part on a calculated cost metric. The operations of block 815 may be performed according to the methods described with reference to FIGS. 1 through 3B. In certain examples, aspects of the operations of block 815 may be performed by a caching component as described with reference to FIGS. 4 through 7.

At block 820 the wireless relay device may forward at least one of the one or more delay-tolerant messages. The one or more delay-tolerant messages may be forwarded to a network. The operations of block 820 may be performed according to the methods described with reference to FIGS. 1 through 3B. In certain examples, aspects of the operations of block 820 may be performed by a message forwarding component as described with reference to FIGS. 4 through 7.

Figure 9:
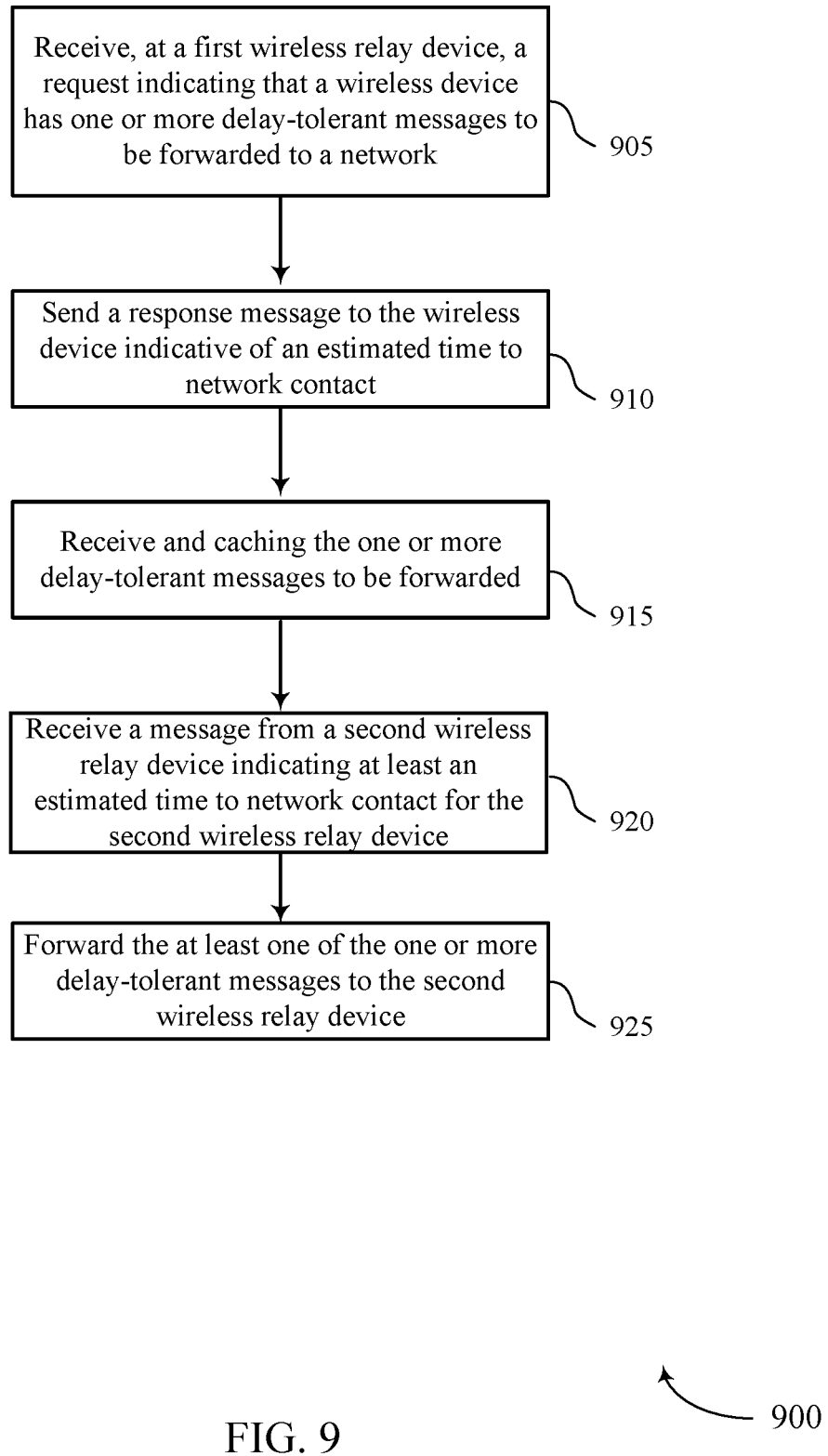

FIG. 9 shows a flowchart illustrating a method 900 for forwarding node selection and routing for delay-tolerant messages in accordance with various aspects of the present disclosure. The operations of method 900 may be implemented by a wireless relay device, such as a UE 115 or its components as described herein. For example, the operations of method 900 may be performed by a selection and routing manager as described with reference to FIGS. 4 through 7. In some examples, a UE 115 may execute a set of codes to control the functional elements of the device to perform the functions described below. Additionally or alternatively, the UE 115 may perform aspects the functions described below using special-purpose hardware.

At block 905, the wireless relay device may receive a request indicating that a wireless device has one or more delay-tolerant messages to be forwarded to a network. The request may comprise a delay tolerance or a deadline for when the one or more delay-tolerant messages are to be sent to the network. The operations of block 905 may be performed according to the methods described with reference to FIGS. 1 through 3B. In certain examples, aspects of the operations of block 905 may be performed by a message request component as described with reference to FIGS. 4 through 7.

At block 910, the wireless relay device may send a response message to the wireless device indicative of an estimated time to network contact. The response message may include the estimated time to network contact. The operations of block 915 may be performed according to the methods described with reference to FIGS. 1 through 3B. In certain examples, aspects of the operations of block 915 may be performed by a response message component as described with reference to FIGS. 4 through 7.

At block 915, the wireless relay device may receive and cache the one or more delay-tolerant messages to be forwarded. In some instances, the wireless relay device may delete one or more of the delay-tolerant messages based at least in part on the one or more of the delay-tolerant messages not being forwarded within the delay tolerance or within the deadline. Also, the wireless relay device may allow for one or more delay-tolerant messages to remain cached based at least in part on a calculated cost metric. The operations of block 915 may be performed according to the methods described with reference to FIGS. 1 through 3B. In certain examples, aspects of the operations of block 915 may be performed by a caching component as described with reference to FIGS. 4 through 7.

At block 920, the wireless relay device may receive a message from a second wireless relay device indicative of an estimated time to network contact for the second UE. The message may include a cost metric from the second wireless relay device. The operations of block 920 may be performed according to the methods described with reference to FIGS. 1 through 3B. In certain examples, aspects of the operations of block 920 may be performed by a message transmission component as described with reference to FIGS. 4 through 7.

At block 925, the wireless relay device may forward at least one of the one or more delay-tolerant messages to the second UE. The forwarding of the one or more delay tolerant messages may be based at least in part on the received cost metric from the second wireless relay device. The operations of block 925 may be performed according to the methods described with reference to FIGS. 1 through 3B. In certain examples, aspects of the operations of block 925 may be performed by a message forwarding component as described with reference to FIGS. 4 through 7.

Figure 10:
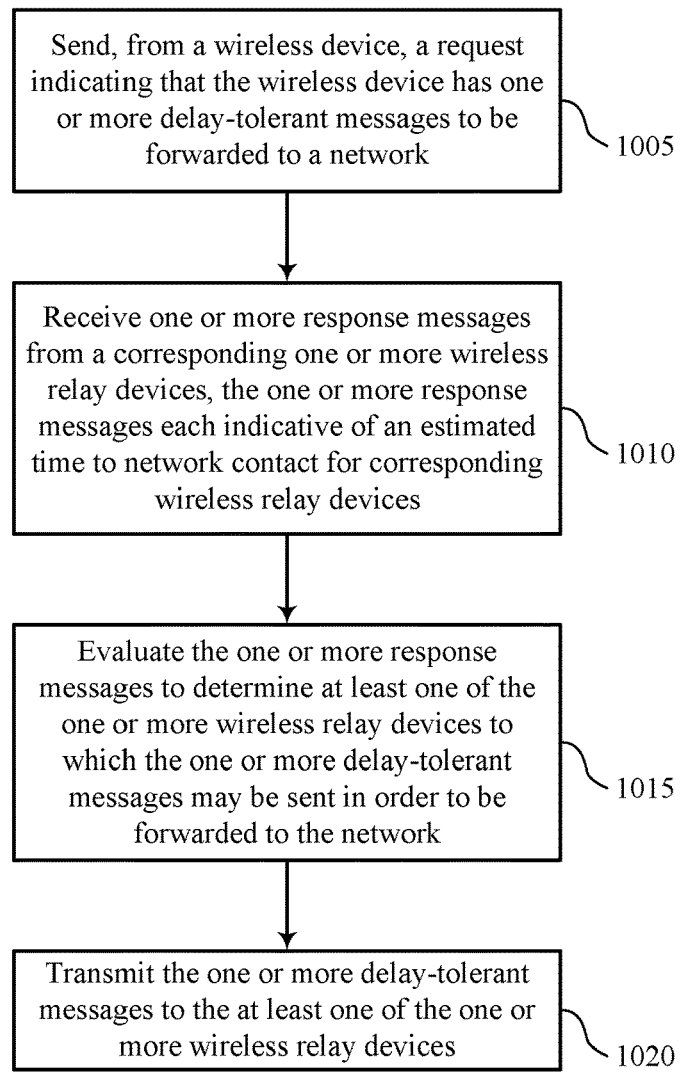

FIG. 10 shows a flowchart illustrating a method 1000 for forwarding node selection and routing for delay-tolerant messages in accordance with various aspects of the present disclosure. The operations of method 1000 may be implemented by a wireless device 205 (e.g., IoT device) or its components as described herein. For example, the operations of method 1000 may be performed by a selection and routing manager as described with reference to FIGS. 4 through 7. In some examples, a wireless device 205 may execute a set of codes to control the functional elements of the device to perform the functions described below. Additionally or alternatively, the wireless device 205 may perform aspects the functions described below using special-purpose hardware.

At block 1005, the wireless device 205 may send a request indicating that the wireless device 205 has one or more delay-tolerant messages to be forwarded to a network. The wireless device 205 may use a transmission protocol such as BLE, WiFi Aware, LTE Direct, or LTE Proximity Services. The request may comprise a delay tolerance or a deadline for when the one or more delay-tolerant messages are to be sent to the network. The operations of block 1005 may be performed according to the methods described with reference to FIGS. 1 through 3B. In certain examples, aspects of the operations of block 1005 may be performed by a message request component as described with reference to FIGS. 4 through 7.

At block 1010, the wireless device 205 may receive one or more response messages from a corresponding one or more wireless relay devices. The one or more response messages may be indicative of an estimated time to network contact for the corresponding wireless relay devices. The one or more response messages may further comprise a cost metric, wherein the cost metric is based on at least one of: monetary costs, wireless relay device resource usage, channel quality, or an existing connection a wireless relay device has with the network. The operations of block 1010 may be performed according to the methods described with reference to FIGS. 1 through 3B. In certain examples, aspects of the operations of block 1010 may be performed by a response message component as described with reference to FIGS. 5 through 7.

At block 1015, the wireless device 205 may evaluate the one or more response messages to determine at least one wireless relay devices to which the one or more delay-tolerant messages may be sent in order to be forwarded to the network. Evaluating the one or more response messages may further comprise determining a probability that the one or more delay-tolerant messages will be forwarded to the network within a delay tolerance or before a deadline. The operations of block 1015 may be performed according to the methods described with reference to FIGS. 1 through 3B. In certain examples, aspects of the operations of block 1015 may be performed by a message evaluation component as described with reference to FIGS. 5 through 7.

At block 1020, the wireless device 205 may transmit the one or more delay-tolerant messages to at least one of the wireless relay devices. The operations of block 1020 may be performed according to the methods described with reference to FIGS. 1 through 3B. In certain examples, aspects of the operations of block 1020 may be performed by a message transmission component as described with reference to FIGS. 5 through 7.

Figure 11:
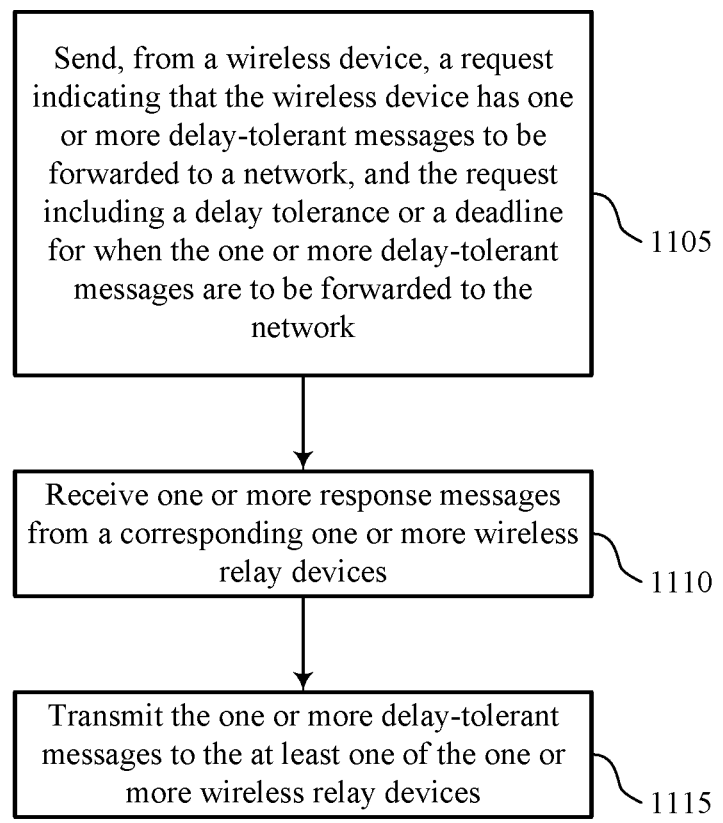

FIG. 11 shows a flowchart illustrating a method 1100 for forwarding node selection and routing for delay-tolerant messages in accordance with various aspects of the present disclosure. The operations of method 1100 may be implemented by a wireless device 205 (e.g., IoT device) or its components as described herein. For example, the operations of method 1100 may be performed by a selection and routing manager as described with reference to FIGS. 4 through 7. In some examples, a wireless device 205 may execute a set of codes to control the functional elements of the device to perform the functions described below. Additionally or alternatively, the wireless device 205 may perform aspects the functions described below using special-purpose hardware.

At block 1105, the wireless device 205 may send a request indicating that the wireless device 205 has one or more delay-tolerant messages to be forwarded to a network. The wireless device 205 may use a transmission protocol such as BLE, WiFi Aware, LTE Direct, or LTE Proximity Services. The request may comprise a delay tolerance or a deadline for when the one or more delay-tolerant messages are to be sent to the network. The operations of block 1105 may be performed according to the methods described with reference to FIGS. 1 through 3B. In certain examples, aspects of the operations of block 1005 may be performed by a message request component as described with reference to FIGS. 4 through 7.

At block 1110, the wireless device 205 may receive one or more response messages from a corresponding one or more wireless relay devices. The one or more response messages may be indicative of an estimated time to network contact for the corresponding wireless relay devices. The one or more response messages may further comprise a cost metric, wherein the cost metric is based on at least one of: monetary costs, wireless relay device resource usage, channel quality, or an existing connection a wireless relay device has with the network. The operations of block 1110 may be performed according to the methods described with reference to FIGS. 1 through 3B. In certain examples, aspects of the operations of block 1010 may be performed by a response message component as described with reference to FIGS. 5 through 7.

At block 1115, the wireless device 205 may transmit the one or more delay-tolerant messages to at least one of the wireless relay devices. The operations of block 1115 may be performed according to the methods described with reference to FIGS. 1 through 3B. In certain examples, aspects of the operations of block 1115 may be performed by a message transmission component as described with reference to FIGS. 5 through 7.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving, at a first wireless relay device, a request indicating that a wireless device has one or more delay-tolerant messages to be forwarded to a network;
sending a response message to the wireless device indicative of an estimated time to network contact;
receiving and caching the one or more delay-tolerant messages to be forwarded; and
forwarding at least one of the one or more delay-tolerant messages.

2. The method of claim 1, further comprising:
receiving a message from a second wireless relay device indicating at least an estimated time to network contact for the second wireless relay device; and
forwarding the at least one of the one or more delay-tolerant messages to the second wireless relay device.

3. The method of claim 2, further comprising:
receiving a cost metric from the second wireless relay device, wherein forwarding the at least one of the one or more delay tolerant messages is based at least in part on the received cost metric.

4. The method of claim 1, wherein
sending the response message to the wireless device comprises: including the estimated time to network contact in the response message.

5. The method of claim 1, wherein
the request comprises a delay tolerance or a deadline for when the one or more delay-tolerant messages are to be sent to the network.

6. The method of claim 5, wherein
sending the response message to the wireless device comprises: comparing the estimated time to network contact with the delay tolerance or deadline; and
the method further comprising sending the response message to the wireless device based on the comparing.

7. The method of claim 5, further comprising:
deleting one or more of the delay-tolerant messages based at least in part on the one or more of the delay-tolerant messages not being forwarded within the delay tolerance or within the deadline.

8. The method of claim 1, further comprising:
determining, by the first wireless relay device, the estimated time to network contact indicating a next time the first wireless relay device is expected to make network contact for at least one radio access technology (RAT) using a history of contact with the network via the at least one RAT.

9. The method of claim 8, further comprising:
maintaining the determined estimated time to network contact for each respective RAT that the first wireless relay device is capable of using.

10. The method of claim 1, further comprising:
calculating a cost metric for at least one radio access technology (RAT), wherein the cost metric is based on at least one of: monetary costs, wireless relay device resource usage, channel quality, or an existing connection the first wireless relay device has with the network; and
transmitting the calculated cost metric to the wireless device.

11. The method of claim 10, wherein
at least one of the one or more delay-tolerant messages remains cached based at least in part on the calculated cost metric.

12. The method of claim 1, wherein
the estimated time to network contact is based on at least one of: supported access networks, mobility patterns, application traffic dynamics, or combinations thereof.

13. The method of claim 1, further comprising:
broadcasting a message indicating an estimated time to network contact.

14. The method of claim 1, wherein
the at least one of the one or more delay-tolerant messages is forwarded to the network.

15. A method for wireless communication, comprising:
sending, from a wireless device, a request indicating that the wireless device has one or more delay-tolerant messages to be forwarded to a network;
receiving one or more response messages from a corresponding one or more wireless relay devices, the one or more response messages each indicative of an estimated time to network contact for corresponding wireless relay devices;
evaluating the one or more response messages to determine at least one of the one or more wireless relay devices to which the one or more delay-tolerant messages may be sent in order to be forwarded to the network; and
transmitting the one or more delay-tolerant messages to the at least one of the one or more wireless relay devices.

16. The method of claim 15, wherein
sending the request comprises: including in the request a delay tolerance or a deadline for when the one or more delay-tolerant messages are to be forwarded to the network.

17. The method of claim 15, wherein
the one or more response messages further comprise a cost metric, wherein the cost metric is based on at least one of: monetary costs, wireless relay device resource usage, channel quality, or an existing connection a wireless relay device has with the network.

18. The method of claim 15, wherein
the estimated time to network contact is based on at least one of: supported access networks, mobility patterns, application traffic dynamics, or combinations thereof.

19. The method of claim 15, wherein
the one or more response messages comprise one or more broadcast messages received from the one or more wireless relay devices.

20. The method of claim 15, wherein
evaluating the one or more response messages further comprises: determining a probability that the one or more delay-tolerant messages will be forwarded to the network within a delay tolerance or before a deadline.

21. The method of claim 15, wherein
sending the request comprises using a transmission protocol that is one of: Bluetooth low energy (BLE), WiFi Aware, Long Term Evolution (LTE) Direct, or LTE Proximity Services.

22. A method for wireless communication, comprising:
sending, from a wireless device, a request indicating that the wireless device has one or more delay-tolerant messages to be forwarded to a network, and the request including a delay tolerance or a deadline for when the one or more delay-tolerant messages are to be forwarded to the network;
receiving one or more response messages from a corresponding one or more wireless relay devices; and
transmitting the one or more delay-tolerant messages to the at least one of the one or more wireless relay devices.

23. The method of claim 22, further comprising:
evaluating the one or more response messages to determine at least one of the one or more wireless relay devices to which the one or more delay tolerant messages may be sent in order to be forwarded to the network, wherein the one or more response messages include one or more evaluation parameters.

24. The method of claim 23, wherein
the one or more evaluation parameters include a cost metric, wherein the cost metric is based on at least one of: monetary costs, wireless relay device resource usage, channel quality, or an existing connection a wireless relay device has with the network.

25. The method of claim 23, wherein
the one or more evaluation parameters include an estimated time to network contact for the corresponding wireless relay device, wherein the estimated time to network contact is based on at least one of: supported access networks, mobility patterns, application traffic dynamics, or combinations thereof.

26. The method of claim 23, wherein
evaluating the one or more response messages further comprises: determining a probability that the one or more delay-tolerant messages will be forwarded to the network within the delay tolerance or before the deadline.

27. The method of claim 22, wherein
sending the request comprises using a transmission protocol that is one of: Bluetooth low energy (BLE), WiFi Aware, Long Term Evolution (LTE) Direct, or LTE Proximity Services.

28. An apparatus for wireless communication, comprising:
means for receiving, at a first wireless relay device, a request indicating that a wireless device has one or more delay-tolerant messages to be forwarded to a network;
means for sending a response message to the wireless device indicative of an estimated time to network contact;
means for receiving and caching the one or more delay-tolerant messages to be forwarded; and
means for forwarding at least one of the one or more delay-tolerant messages.

29. The apparatus of claim 28, further comprising:
means for receiving a message from a second wireless relay device indicating at least an estimated time to network contact for the second wireless relay device; and
means for forwarding the at least one of the one or more delay-tolerant messages to the second wireless relay device.

30. The apparatus of claim 29, further comprising:
means for receiving a cost metric from the second wireless relay device, wherein forwarding the at least one of the one or more delay tolerant messages is based at least in part on the received cost metric.

31. The apparatus of claim 28, wherein
the means for sending the response message to the wireless device comprises: means for including the estimated time to network contact in the response message.

32. The apparatus of claim 28, wherein
the request comprises a delay tolerance or a deadline for when the one or more delay-tolerant messages are to be sent to the network.

33. The apparatus of claim 32, wherein
the means for sending the response message to the wireless device comprises: means for comparing the estimated time to network contact with the delay tolerance or deadline; and
the apparatus further comprising means for sending the response message to the wireless device based on the comparing.

34. The apparatus of claim 32, further comprising:
means for deleting one or more of the delay-tolerant messages based at least in part on the one or more of the delay-tolerant messages not being forwarded within the delay tolerance or within the deadline.

35. The apparatus of claim 28, further comprising:
means for determining, by the first wireless relay device, the estimated time to network contact indicating a next time the first wireless relay device is expected to make network contact for at least one radio access technology (RAT) using a history of contact with the network via the at least one RAT.

36. The apparatus of claim 35, further comprising:
means for maintaining the determined estimated time to network contact for each respective RAT that the first wireless relay device is capable of using.

37. The apparatus of claim 28, further comprising:
means for calculating a cost metric for at least one radio access technology (RAT), wherein the cost metric is based on at least one of: monetary costs, wireless relay device resource usage, channel quality, or an existing connection the first wireless relay device has with the network; and
means for transmitting the calculated cost metric to the wireless device.

38. The apparatus of claim 37, wherein
at least one of the one or more delay-tolerant messages remains cached based at least in part on the calculated cost metric.

39. The apparatus of claim 28, wherein
the estimated time to network contact is based on at least one of: supported access networks, mobility patterns, application traffic dynamics, or combinations thereof.

40. The apparatus of claim 28, further comprising:
means for broadcasting a message indicating an estimated time to network contact.

41. The apparatus of claim 28, wherein
the at least one of the one or more delay-tolerant messages is forwarded to the network.

42. An apparatus for wireless communication, comprising:
means for sending, from a wireless device, a request indicating that the wireless device has one or more delay-tolerant messages to be forwarded to a network;
means for receiving one or more response messages from a corresponding one or more wireless relay devices, the one or more response messages each indicative of an estimated time to network contact for corresponding wireless relay devices;
means for evaluating the one or more response messages to determine at least one of the one or more wireless relay devices to which the one or more delay-tolerant messages may be sent in order to be forwarded to the network; and
means for transmitting the one or more delay-tolerant messages to the at least one of the one or more wireless relay devices.

43. The apparatus of claim 42, wherein
the means for sending the request comprises: means for including in the request a delay tolerance or a deadline for when the one or more delay-tolerant messages are to be forwarded to the network.

44. The apparatus of claim 42, wherein
the one or more response messages further comprise a cost metric, wherein the cost metric is based on at least one of: monetary costs, wireless relay device resource usage, channel quality, or an existing connection a wireless relay device has with the network.

45. The apparatus of claim 42, wherein
the estimated time to network contact is based on at least one of: supported access networks, mobility patterns, application traffic dynamics, or combinations thereof.

46. The apparatus of claim 42, wherein
the one or more response messages comprise one or more broadcast messages received from the one or more wireless relay devices.

47. The apparatus of claim 42, wherein
the means for evaluating the one or more response messages further comprises: means for determining a probability that the one or more delay-tolerant messages will be forwarded to the network within a delay tolerance or before a deadline.

48. The apparatus of claim 42, wherein
the means for sending the request comprises means for using a transmission protocol that is one of: Bluetooth low energy (BLE), WiFi Aware, Long Term Evolution (LTE) Direct, or LTE Proximity Services.

49. An apparatus for wireless communication, comprising:
means for sending, from a wireless device, a request indicating that the wireless device has one or more delay-tolerant messages to be forwarded to a network, and the request including a delay tolerance or a deadline for when the one or more delay-tolerant messages are to be forwarded to the network;
means for receiving one or more response messages from a corresponding one or more wireless relay devices; and
means for transmitting the one or more delay-tolerant messages to the at least one of the one or more wireless relay devices.

50. The apparatus of claim 49, further comprising:
means for evaluating the one or more response messages to determine at least one of the one or more wireless relay devices to which the one or more delay tolerant messages may be sent in order to be forwarded to the network, wherein the one or more response messages include one or more evaluation parameters.

51. The apparatus of claim 50, wherein
the one or more evaluation parameters include a cost metric, wherein the cost metric is based on at least one of: monetary costs, wireless relay device resource usage, channel quality, or an existing connection a wireless relay device has with the network.

52. The apparatus of claim 50, wherein
the one or more evaluation parameters include an estimated time to network contact for the corresponding wireless relay device, wherein the estimated time to network contact is based on at least one of: supported access networks, mobility patterns, application traffic dynamics, or combinations thereof.

53. The apparatus of claim 50, wherein
the means for evaluating the one or more response messages further comprises: means for determining a probability that the one or more delay-tolerant messages will be forwarded to the network within the delay tolerance or before the deadline.

54. The apparatus of claim 49, wherein
the means for sending the request comprises means for using a transmission protocol that is one of: Bluetooth low energy (BLE), WiFi Aware, Long Term Evolution (LTE) Direct, or LTE Proximity Services.

55. An apparatus for wireless communication, in a system comprising:
a processor;
memory in electronic communication with the processor; and
instructions stored in the memory and operable, when executed by the processor, to cause the apparatus to:
receive, at a first wireless relay device, a request indicating that a wireless device has one or more delay-tolerant messages to be forwarded to a network;
send a response message to the wireless device indicative of an estimated time to network contact;
receive and caching the one or more delay-tolerant messages to be forwarded; and
forward at least one of the one or more delay-tolerant messages.

56. The apparatus of claim 55, wherein the instructions are further executable by the processor to:
receive a message from a second wireless relay device indicating at least an estimated time to network contact for the second wireless relay device; and
forward the at least one of the one or more delay-tolerant messages to the second wireless relay device.

57. The apparatus of claim 56, wherein the instructions are further executable by the processor to:
receive a cost metric from the second wireless relay device, wherein forwarding the at least one of the one or more delay tolerant messages is based at least in part on the received cost metric.

58. The apparatus of claim 55, wherein the instructions are further executable by the processor to:
include the estimated time to network contact in the response message.

59. The apparatus of claim 55, wherein
the request comprises a delay tolerance or a deadline for when the one or more delay-tolerant messages are to be sent to the network.

60. The apparatus of claim 59, wherein the instructions executable to cause the apparatus to perform the sending of the response message to the wireless device comprise instructions executable to cause the apparatus to:
compare the estimated time to network contact with the delay tolerance or deadline; and
send the response message to the wireless device based on the comparing.

61. The apparatus of claim 59, wherein the instructions are further executable by the processor to:
delete one or more of the delay-tolerant messages based at least in part on the one or more of the delay-tolerant messages not being forwarded within the delay tolerance or within the deadline.

62. The apparatus of claim 55, wherein the instructions are further executable by the processor to:
determine, by the first wireless relay device, the estimated time to network contact indicating a next time the first wireless relay device is expected to make network contact for at least one radio access technology (RAT) using a history of contact with the network via the at least one RAT.

63. The apparatus of claim 62, wherein the instructions are further executable by the processor to:
maintain the determined estimated time to network contact for each respective RAT that the first wireless relay device is capable of using.

64. The apparatus of claim 55, wherein the instructions are further executable by the processor to:
calculate a cost metric for at least one radio access technology (RAT), wherein the cost metric is based on at least one of: monetary costs, wireless relay device resource usage, channel quality, or an existing connection the first wireless relay device has with the network; and
transmit the calculated cost metric to the wireless device.

65. The apparatus of claim 64, wherein
at least one of the one or more delay-tolerant messages remains cached based at least in part on the calculated cost metric.

66. The apparatus of claim 55, wherein
the estimated time to network contact is based on at least one of: supported access networks, mobility patterns, application traffic dynamics, or combinations thereof.

67. The apparatus of claim 55, wherein the instructions are further executable by the processor to:

broadcast a message indicating an estimated time to network contact.

68. The apparatus of claim 55, wherein
the at least one of the one or more delay-tolerant messages is forwarded to the network.

69. An apparatus for wireless communication, in a system comprising:
a processor;
memory in electronic communication with the processor; and
instructions stored in the memory and operable, when executed by the processor, to cause the apparatus to:
send, from a wireless device, a request indicating that the wireless device has one or more delay-tolerant messages to be forwarded to a network;
receive one or more response messages from a corresponding one or more wireless relay devices, the one or more response messages each indicative of an estimated time to network contact for corresponding wireless relay devices;
evaluate the one or more response messages to determine at least one of the one or more wireless relay devices to which the one or more delay-tolerant messages may be sent in order to be forwarded to the network; and
transmit the one or more delay-tolerant messages to the at least one of the one or more wireless relay devices.

70. The apparatus of claim 69, wherein the instructions executable to cause the apparatus to send the request comprise instructions executable to cause the apparatus to:
include in the request a delay tolerance or a deadline for when the one or more delay-tolerant messages are to be forwarded to the network.

71. The apparatus of claim 69, wherein
the one or more response messages further comprise a cost metric, wherein the cost metric is based on at least one of: monetary costs, wireless relay device resource usage, channel quality, or an existing connection a wireless relay device has with the network.

72. The apparatus of claim 69, wherein
the estimated time to network contact is based on at least one of: supported access networks, mobility patterns, application traffic dynamics, or combinations thereof.

73. The apparatus of claim 69, wherein
the one or more response messages comprise one or more broadcast messages received from the one or more wireless relay devices.

74. The apparatus of claim 69, wherein the instructions executable to cause the apparatus to evaluate the one or more response messages comprise instructions executable to cause the apparatus to:
determine a probability that the one or more delay-tolerant messages will be forwarded to the network within a delay tolerance or before a deadline.

75. The apparatus of claim 69, wherein the instructions executable to cause the apparatus to send the request comprise instructions executable to cause the apparatus to:
use a transmission protocol that is one of: Bluetooth low energy (BLE), WiFi Aware, Long Term Evolution (LTE) Direct, or LTE Proximity Services.

76. An apparatus for wireless communication, in a system comprising:
a processor;
memory in electronic communication with the processor; and
instructions stored in the memory and operable, when executed by the processor, to cause the apparatus to:
send, from a wireless device, a request indicating that the wireless device has one or more delay-tolerant messages to be forwarded to a network, and the request including a delay tolerance or a deadline for when the one or more delay-tolerant messages are to be forwarded to the network;
receive one or more response messages from a corresponding one or more wireless relay devices; and
transmit the one or more delay-tolerant messages to the at least one of the one or more wireless relay devices.

77. The apparatus of claim 76, wherein the instructions are further executable by the processor to:
evaluate the one or more response messages to determine at least one of the one or more wireless relay devices to which the one or more delay tolerant messages may be sent in order to be forwarded to the network, wherein the one or more response messages include one or more evaluation parameters.

78. The apparatus of claim 77, wherein
the one or more evaluation parameters include a cost metric, wherein the cost metric is based on at least one of: monetary costs, wireless relay device resource usage, channel quality, or an existing connection a wireless relay device has with the network.

79. The apparatus of claim 77, wherein
the one or more evaluation parameters include an estimated time to network contact for the corresponding wireless relay device, wherein the estimated time to network contact is based on at least one of: supported access networks, mobility patterns, application traffic dynamics, or combinations thereof.

80. The apparatus of claim 77, wherein the instructions executable to cause the apparatus to evaluate the one or more response messages comprise instructions executable to cause the apparatus to:
determine a probability that the one or more delay-tolerant messages will be forwarded to the network within the delay tolerance or before the deadline.

81. The apparatus of claim 76, wherein the instructions executable to cause the apparatus to send the request comprise instructions executable to cause the apparatus to:
use a transmission protocol that is one of: Bluetooth low energy (BLE), WiFi Aware, Long Term Evolution (LTE) Direct, or LTE Proximity Services.

82. A non-transitory computer readable medium storing code for wireless communication, the code comprising instructions executable by a processor to:
receive, at a first wireless relay device, a request indicating that a wireless device has one or more delay-tolerant messages to be forwarded to a network;
send a response message to the wireless device indicative of an estimated time to network contact;
receive and caching the one or more delay-tolerant messages to be forwarded; and
forward at least one of the one or more delay-tolerant messages.

83. The non-transitory computer-readable medium of claim 82, wherein the instructions are further executable by the processor to:
receive a message from a second wireless relay device indicating at least an estimated time to network contact for the second wireless relay device; and
forward the at least one of the one or more delay-tolerant messages to the second wireless relay device.

84. The non-transitory computer-readable medium of claim 83, wherein the instructions are further executable by the processor to:

receive a cost metric from the second wireless relay device, wherein forwarding the at least one of the one or more delay tolerant messages is based at least in part on the received cost metric.

85. The non-transitory computer-readable medium of claim 82, wherein the instructions executable to send the response message to the wireless device comprise instructions executable to:
include the estimated time to network contact in the response message.

86. The non-transitory computer-readable medium of claim 82, wherein
the request comprises a delay tolerance or a deadline for when the one or more delay-tolerant messages are to be sent to the network.

87. The non-transitory computer-readable medium of claim 86, wherein the instructions executable to send the response message to the wireless device comprise instructions executable to:
compare the estimated time to network contact with the delay tolerance or deadline; and
send the response message to the wireless device based on the comparing.

88. The non-transitory computer-readable medium of claim 86, wherein the instructions are further executable by the processor to:
delete one or more of the delay-tolerant messages based at least in part on the one or more of the delay-tolerant messages not being forwarded within the delay tolerance or within the deadline.

89. The non-transitory computer-readable medium of claim 82, wherein the instructions are further executable by the processor to:
determine, by the first wireless relay device, the estimated time to network contact indicating a next time the first wireless relay device is expected to make network contact for at least one radio access technology (RAT) using a history of contact with the network via the at least one RAT.

90. The non-transitory computer-readable medium of claim 89, wherein the instructions are further executable by the processor to:
maintain the determined estimated time to network contact for each respective RAT that the first wireless relay device is capable of using.

91. The non-transitory computer-readable medium of claim 82, wherein the instructions are further executable by the processor to:
calculate a cost metric for at least one radio access technology (RAT), wherein the cost metric is based on at least one of: monetary costs, wireless relay device resource usage, channel quality, or an existing connection the first wireless relay device has with the network; and
transmit the calculated cost metric to the wireless device.

92. The non-transitory computer-readable medium of claim 91, wherein
at least one of the one or more delay-tolerant messages remains cached based at least in part on the calculated cost metric.

93. The non-transitory computer-readable medium of claim 82, wherein
the estimated time to network contact is based on at least one of: supported access networks, mobility patterns, application traffic dynamics, or combinations thereof.

94. The non-transitory computer-readable medium of claim 82, wherein the instructions are further executable by the processor to:
broadcast a message indicating an estimated time to network contact.

95. The non-transitory computer-readable medium of claim 82, wherein
the at least one of the one or more delay-tolerant messages is forwarded to the network.

96. A non-transitory computer readable medium storing code for wireless communication, the code comprising instructions executable by a processor to:
send, from a wireless device, a request indicating that the wireless device has one or more delay-tolerant messages to be forwarded to a network;
receive one or more response messages from a corresponding one or more wireless relay devices, the one or more response messages each indicative of an estimated time to network contact for corresponding wireless relay devices;
evaluate the one or more response messages to determine at least one of the one or more wireless relay devices to which the one or more delay-tolerant messages may be sent in order to be forwarded to the network; and
transmit the one or more delay-tolerant messages to the at least one of the one or more wireless relay devices.

97. The non-transitory computer-readable medium of claim 96, wherein the instructions executable to send the request comprise instructions executable to:
include in the request a delay tolerance or a deadline for when the one or more delay-tolerant messages are to be forwarded to the network.

98. The non-transitory computer-readable medium of claim 96, wherein
the one or more response messages further comprise a cost metric, wherein the cost metric is based on at least one of: monetary costs, wireless relay device resource usage, channel quality, or an existing connection a wireless relay device has with the network.

99. The non-transitory computer-readable medium of claim 96, wherein
the estimated time to network contact is based on at least one of: supported access networks, mobility patterns, application traffic dynamics, or combinations thereof.

100. The non-transitory computer-readable medium of claim 96, wherein
the one or more response messages comprise one or more broadcast messages received from the one or more wireless relay devices.

101. The non-transitory computer-readable medium of claim 96, wherein the instructions executable to evaluate the one or more response messages comprise instructions executable to:
determine a probability that the one or more delay-tolerant messages will be forwarded to the network within a delay tolerance or before a deadline.

102. The non-transitory computer-readable medium of claim 96, wherein the instructions executable to send the request comprise instructions executable to:
use a transmission protocol that is one of: Bluetooth low energy (BLE), WiFi Aware, Long Term Evolution (LTE) Direct, or LTE Proximity Services.

103. A non-transitory computer readable medium storing code for wireless communication, the code comprising instructions executable by a processor to:
send, from a wireless device, a request indicating that the wireless device has one or more delay-tolerant messages to be forwarded to a network, and the request including a delay tolerance or a deadline for when the one or more delay-tolerant messages are to be forwarded to the network;

receive one or more response messages from a corresponding one or more wireless relay devices; and transmit the one or more delay-tolerant messages to the at least one of the one or more wireless relay devices.

104. The non-transitory computer-readable medium of claim 103, wherein the instructions are further executable by the processor to:

evaluate the one or more response messages to determine at least one of the one or more wireless relay devices to which the one or more delay tolerant messages may be sent in order to be forwarded to the network, wherein the one or more response messages include one or more evaluation parameters.

105. The non-transitory computer-readable medium of claim 104, wherein the one or more evaluation parameters include a cost metric, wherein the cost metric is based on at least one of: monetary costs, wireless relay device resource usage, channel quality, or an existing connection a wireless relay device has with the network.

106. The non-transitory computer-readable medium of claim 104, wherein the one or more evaluation parameters include an estimated time to network contact for the corresponding wireless relay device, wherein the estimated time to network contact is based on at least one of: supported access networks, mobility patterns, application traffic dynamics, or combinations thereof.

107. The non-transitory computer-readable medium of claim 104, wherein the instructions executable to evaluate the one or more response messages comprise instructions executable to:

determine a probability that the one or more delay-tolerant messages will be forwarded to the network within the delay tolerance or before the deadline.

108. The non-transitory computer-readable medium of claim 103, wherein the instructions executable to send the request comprise instructions executable to:

use a transmission protocol that is one of: Bluetooth low energy (BLE), WiFi Aware, Long Term Evolution (LTE) Direct, or LTE Proximity Services.

* * * * *